US012598150B2

(12) United States Patent
Evgey

(10) Patent No.: US 12,598,150 B2
(45) Date of Patent: Apr. 7, 2026

(54) SYSTEM AND METHOD FOR EMPOWERING WEB APPLICATIONS WITH INSTANT BUILT-IN VIDEO CONFERENCING AND ENTERPRISE MESSAGING

(71) Applicant: David Evgey, Baltimore, MD (US)

(72) Inventor: David Evgey, Baltimore, MD (US)

( * ) Notice: Subject to any disclaimer, the term of this patent is extended or adjusted under 35 U.S.C. 154(b) by 0 days.

(21) Appl. No.: 17/084,850

(22) Filed: Oct. 30, 2020

(65) Prior Publication Data

US 2021/0136013 A1 May 6, 2021

Related U.S. Application Data

(60) Provisional application No. 62/929,327, filed on Nov. 1, 2019.

(51) Int. Cl.
*H04L 51/046* (2022.01)
*H04L 51/52* (2022.01)
*H04N 7/15* (2006.01)

(52) U.S. Cl.
CPC ............ *H04L 51/046* (2013.01); *H04L 51/52* (2022.05); *H04N 7/152* (2013.01)

(58) Field of Classification Search
CPC ........ H04L 51/046; H04L 51/32; H04N 7/152
USPC ......................................................... 709/206
See application file for complete search history.

(56) References Cited

U.S. PATENT DOCUMENTS

| | | | | |
|---|---|---|---|---|
| 2006/0120573 A1* | 6/2006 | Iori | ...................... | G06V 10/993 |
| | | | | 324/658 |
| 2007/0299735 A1* | 12/2007 | Mangalick | ............. | G06Q 30/06 |
| | | | | 705/26.41 |
| 2010/0037151 A1* | 2/2010 | Ackerman | .......... | H04L 65/4015 |
| | | | | 715/753 |
| 2011/0270923 A1* | 11/2011 | Jones | .................... | G06F 3/0486 |
| | | | | 709/204 |
| 2012/0117156 A1* | 5/2012 | Anka | ....................... | H04N 7/15 |
| | | | | 709/205 |
| 2014/0111597 A1* | 4/2014 | Anderson | ........... | H04L 65/1073 |
| | | | | 348/14.03 |
| 2017/0213253 A1* | 7/2017 | Golder | ............... | G06Q 30/0269 |
| 2019/0384925 A1* | 12/2019 | Hsu | ......................... | G06F 21/32 |

* cited by examiner

*Primary Examiner* — Atta Khan

(57) ABSTRACT

A system for instantly empowering any social network, and/or application, and/or workflow with live collaboration tools, enterprise messaging and data collection without any code modification. The system is incorporated with cross domain network configuration and comprises a server including a processor and a memory having a plugin component or browser extension executed by the processor. The plugin or browser extension component comprises a registration module, a link generation module, and an instant communication module. The registration module enables a service provider to create an account by registering one or more credentials. The link generation module generates a first URL for each registered service provider. The first URL prompts visitor to install or download the browser extension or plugin, respectively. Upon a visitor clicking on a link the system activates a live video conferencing, chat and data collection and scheduling modules.

16 Claims, 41 Drawing Sheets

100

300

500

600

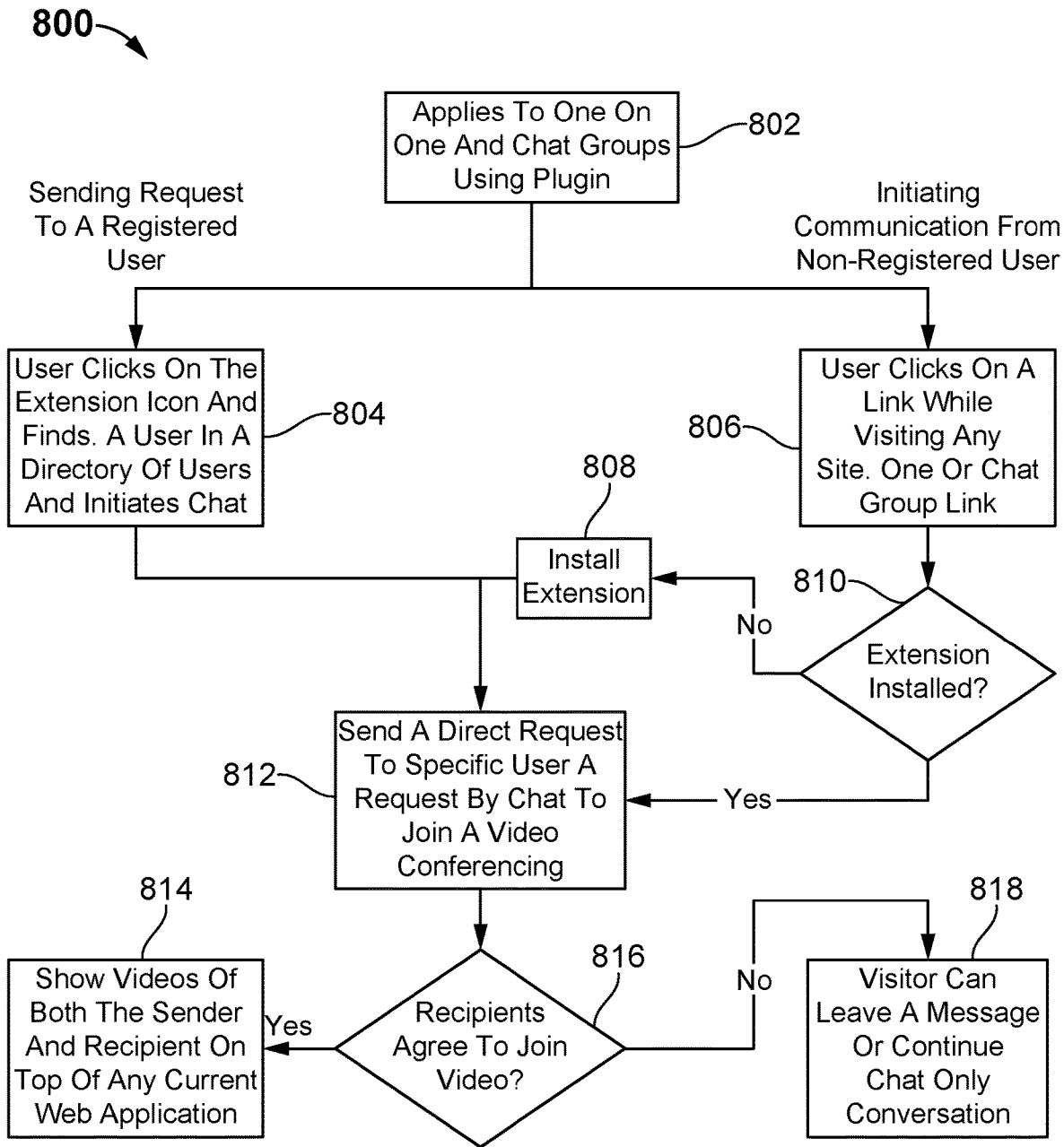

800

Applies To One On One And Chat Groups Using Plugin — 802

Sending Request To A Registered User

Initiating Communication From Non-Registered User

User Clicks On The Extension Icon And Finds. A User In A Directory Of Users And Initiates Chat — 804

User Clicks On A Link While Visiting Any Site. One Or Chat Group Link — 806

808

Install Extension

810

No

Extension Installed?

Send A Direct Request To Specific User A Request By Chat To Join A Video Conferencing — 812

Yes

814

Show Videos Of Both The Sender And Recipient On Top Of Any Current Web Application Yes

816

Recipients Agree To Join Video?

No

818

Visitor Can Leave A Message Or Continue Chat Only Conversation

Figure 12:
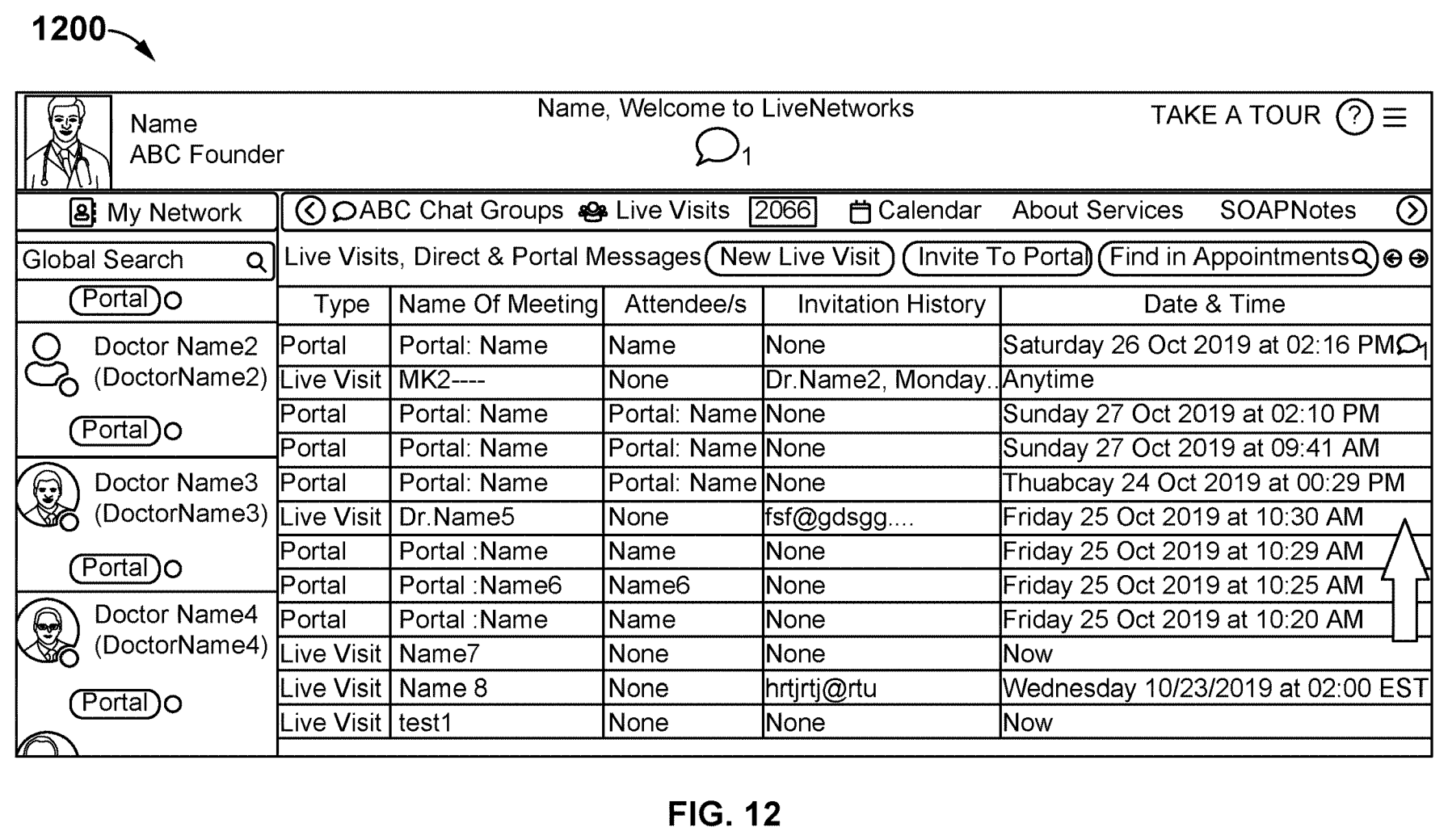

Name
ABC Founder

Name, Welcome to LiveNetworks    TAKE A TOUR (?) ≡

ABC Chat Groups    Live Visits  2066   Calendar   About Services   SOAPNotes

My Network

Global Search

Live Visits, Direct & Portal Messages   New Live Visit   Invite To Portal   Find in Appointments

| | Type | Name Of Meeting | Attendee/s | Invitation History | Date & Time |
|---|---|---|---|---|---|
| Doctor Name2 (DoctorName2) | Portal | Portal: Name | Name | None | Saturday 26 Oct 2019 at 02:16 PM |
| Portal | Live Visit | MK2--- | None | Dr.Name2, Monday.. | Anytime |
| | Portal | Portal: Name | Portal: Name | None | Sunday 27 Oct 2019 at 02:10 PM |
| | Portal | Portal: Name | Portal: Name | None | Sunday 27 Oct 2019 at 09:41 AM |
| Doctor Name3 (DoctorName3) | Live Visit | Dr.Name5 | None | fsf@gdsgg.... | Thuabcay 24 Oct 2019 at 00:29 PM |
| Portal | Portal | Portal :Name | Name | None | Friday 25 Oct 2019 at 10:30 AM |
| | Portal | Portal :Name6 | Name6 | None | Friday 25 Oct 2019 at 10:29 AM |
| Doctor Name4 (DoctorName4) | Portal | Portal :Name | Name | None | Friday 25 Oct 2019 at 10:25 AM |
| | Live Visit | Name7 | None | None | Now |
| Portal | Live Visit | Name 8 | None | hrtjrtj@rtu | Wednesday 10/23/2019 at 02:00 EST |
| | Live Visit | test1 | None | None | Now |

Figure 13:
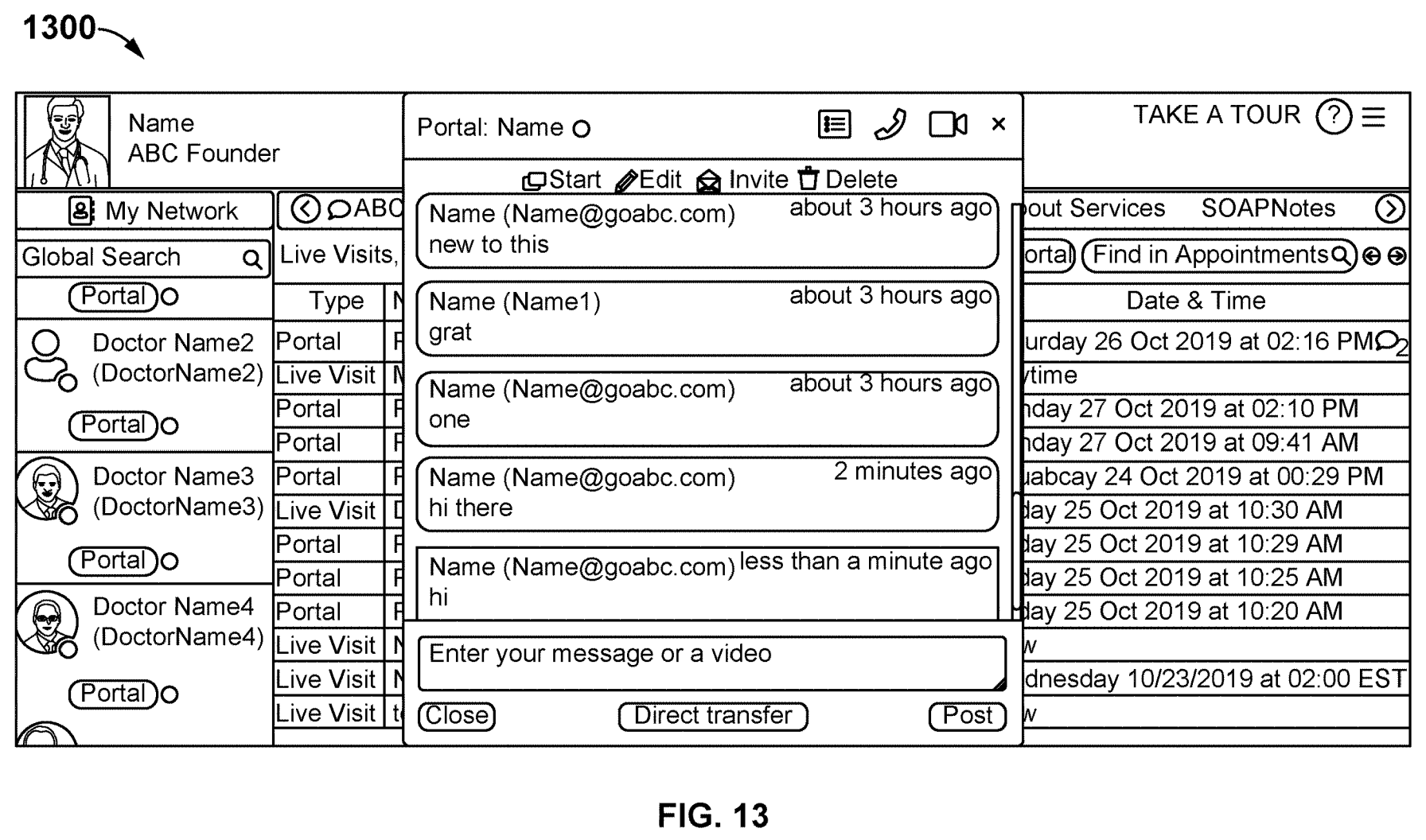

| Name ABC Founder | | |
|---|---|---|

My Network ⊗ ⊘ABC

Global Search 🔍

Live Visits,

| | Type | |
|---|---|---|
| Doctor Name2 (DoctorName2) | Portal | N F |
| Portal ⊙ | Live Visit | N |
| | Portal | F |
| | Portal | F |
| Doctor Name3 (DoctorName3) | Portal | F D |
| Portal ⊙ | Live Visit | F |
| | Portal | F |
| Doctor Name4 (DoctorName4) | Portal | F |
| Portal ⊙ | Live Visit | N |
| | Live Visit | N |
| | Live Visit | t |

Portal: Name ⭘    ▤ ✎ ☐ ✕

⊡Start ✎Edit ✉Invite 🗑Delete

| | |
|---|---|
| Name (Name@goabc.com) | about 3 hours ago |
| new to this | |
| Name (Name1) | about 3 hours ago |
| grat | |
| Name (Name@goabc.com) | about 3 hours ago |
| one | |
| Name (Name@goabc.com) | 2 minutes ago |
| hi there | |
| Name (Name@goabc.com) | less than a minute ago |
| hi | |

Enter your message or a video

Close     Direct transfer     Post

TAKE A TOUR ⓘ ≡

...out Services    SOAPNotes ⌄

...ortal   ( Find in Appointments🔍 ⊕⊛

| | Date & Time |
|---|---|
| ...urday 26 Oct 2019 at 02:16 PM⌂2 | |
| ...rtime | |
| ...nday 27 Oct 2019 at 02:10 PM | |
| ...nday 27 Oct 2019 at 09:41 AM | |
| ...uabcay 24 Oct 2019 at 00:29 PM | |
| ...ay 25 Oct 2019 at 10:30 AM | |
| ...ay 25 Oct 2019 at 10:29 AM | |
| ...ay 25 Oct 2019 at 10:25 AM | |
| ...ay 25 Oct 2019 at 10:20 AM | |
| ...w | |
| ...dnesday 10/23/2019 at 02:00 EST | |
| ...w | |

Health Summary-Master

Page 10 Of 12 - Pharmacy Information

83%

Pharmacy Information
Please Enter Address And Phone Number For
Your Preferred Pharmacy Name Of The Pharmacy          Pharmacy's Phone Number*

- #### - ####

Address Of The Pharmacy

Street Adress

Address Line 2

City                          State/Province/Region

Postal / Zip Code             Country

Previous        Next

2400

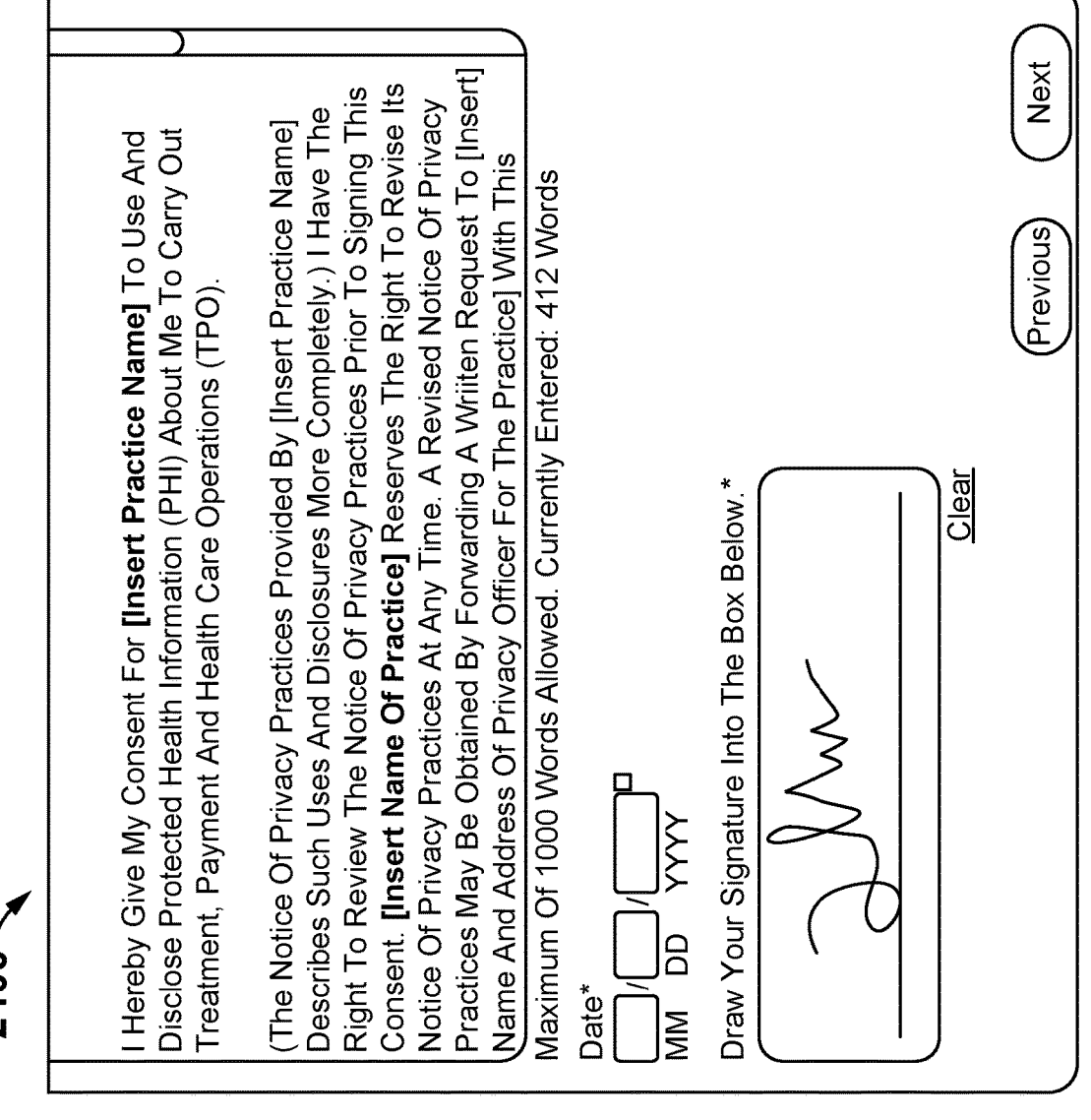

I Hereby Give My Consent For [Insert Practice Name] To Use And Disclose Protected Health Information (PHI) About Me To Carry Out Treatment, Payment And Health Care Operations (TPO).

(The Notice Of Privacy Practices Provided By [Insert Practice Name] Describes Such Uses And Disclosures More Completely.) I Have The Right To Review The Notice Of Privacy Practices Prior To Signing This Consent. [Insert Name Of Practice] Reserves The Right To Revise Its Notice Of Privacy Practices At Any Time. A Revised Notice Of Privacy Practices May Be Obtained By Forwarding A Written Request To [Insert] Name And Address Of Privacy Officer For The Practice] With This Maximum Of 1000 Words Allowed. Currently Entered: 412 Words Date*

MM   DD   YYYY

Draw Your Signature Into The Box Below.*

Clear

Previous   Next

FIG. 24

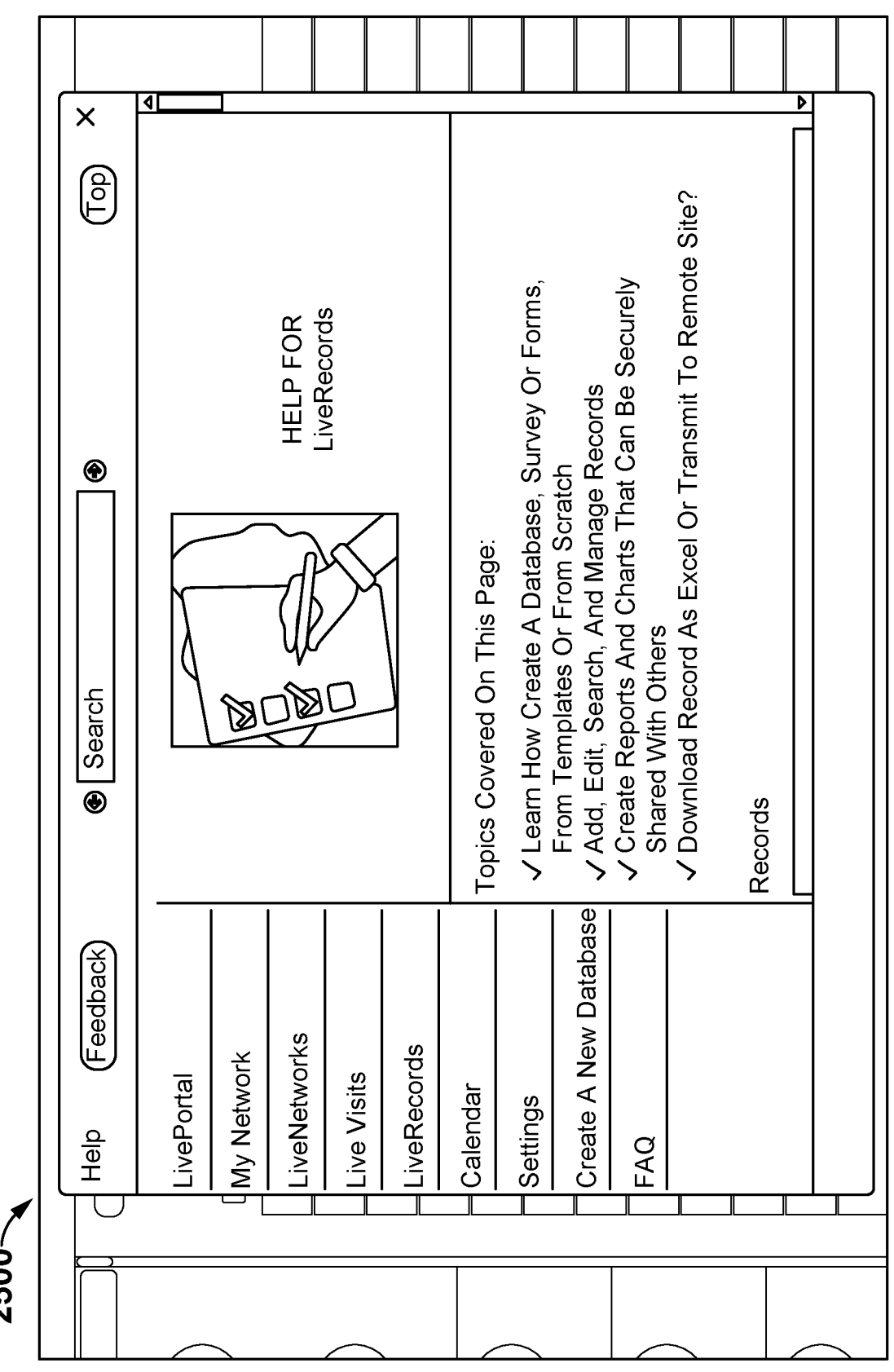

2500

Help    Feedback    ⊛ ⊙  Search    ⊕    Top    ✕

LivePortal
My Network
LiveNetworks
Live Visits
LiveRecords
Calendar
Settings
Create A New Database
FAQ HELP FOR
LiveRecords Topics Covered On This Page:

✓ Learn How Create A Database, Survey Or Forms,
   From Templates Or From Scratch
✓ Add, Edit, Search, And Manage Records
✓ Create Reports And Charts That Can Be Securely
   Shared With Others
✓ Download Record As Excel Or Transmit To Remote Site?

Records

SYSTEM AND METHOD FOR EMPOWERING WEB APPLICATIONS WITH INSTANT BUILT-IN VIDEO CONFERENCING AND ENTERPRISE MESSAGING

CROSS REFERENCE TO RELATED APPLICATION

The present application claims the benefit of U.S. Provisional Patent Application No. 62/929,327 filed Nov. 1, 2019, the contents of which is hereby incorporated by reference

BACKGROUND OF THE INVENTION

A. Technical Field

The present invention generally relates to social networking services. Specifically, the present invention relates to a system and method for providing enhanced social networking services such as video conferencing, enterprise messaging, and structured data exchange without any code modification via a plugin or browser extension. The present invention empowers any web application or workflow with instant built-in video conferencing, enterprise messaging, and structured data exchange without any code modification using, a browser extension.

B. Description of Related Art

The rapid growth of information technology and the internet has changed the way and means of communication around the world. The coronavirus (COVID-19) outbreak has significantly accelerated the pace adopting technologies related to video conferencing and enterprise messaging to address widespread concern and economic hardship for consumers, businesses and communities across the globe remote work, online education and social distancing will create demand for products and services delivered by the tech industry. The crisis underscores the need for flexible, resilient business tools to facilitate collaboration within and across enterprises.

With a computer and internet connection, one can easily communicate with others in any part of the world. This communication has been made easier and quicker via social media networks or online applications such as Facebook®, LinkedIn®, Twitter®, Instagram®, etc. The usage of internet-based social media has increased dramatically over the last decade and continuous at an incline. Reports state that around 74% of internet users are on social media.

While social media and e-mail have addressed many of the communication needs it didn't address some very specific needs. Chief among these needs is the lack of private and secure communication that is seamlessly integrated with the business's workflow. The Covid-19 pandemic which forced many employees to work remotely from home clearly demonstrated the demand for services to address those needs.

This invention, known as LiveNetworks, addresses that needs and enables users integrate live video and enterprise collaboration tools with any application and/or workflow, instantly without code modification.

Each social media has a dedicated application, which allows users to register into the corresponding online platform to utilize their services. The user could enter into the application by providing various information such as personal information, educational qualification, employment information, hobbies, and interests. The information of the registered user is often configured to their user profile, which is available to the public via social media to connect with other users.

These social media platforms could be accessed by users via communication or mobile devices such as computers, laptops, tablets, smartphones, or handheld electronic communication devices. A number of social media platforms are available to connect and be connected with people. Along with the increasing number of social media platforms, the technology and method of usage of the social media platforms also keep on changing. Hence people need to be kept updated on ever changing technology, which increases the difficulty of usage of social media platforms. Additional, finding time to maintain a presence on multiple platforms at one time is impossible.

Few existing patent references attempted to address the aforementioned problems are cited in the background as prior art over the presently disclosed subject matter and are explained as follows:

A prior art US 20180183738 A1 to Tevian Parnell entitled "online social media interaction system" discloses a system and method for connecting a number of users to enable interaction between the users through an integrated online social media and instant messaging platform. The system includes an electronic communication device configured to run an integrated social media and instant messaging application, which includes a social networking module for providing a variety of social media-related services to the users, a social media integration module for integrating a number of online social media platforms of the user, and an instant messaging module for enabling interaction between the users. A server in communication with the electronic communication devices manages the contents presented through the integrated social media and instant messaging application over a communication channel. The integrated social media and instant messaging application allow the users to integrate online social media platforms, enable interaction between the users and publish the social media contents through a dynamic graphical user interface.

Another prior art US 20100199340 A1 to Lawrence A. Jonas, et al., entitled "system for integrating multiple IM networks and social networking websites" disclose systems and methods for the integration of instant messaging applications and social networking websites. The system allows a user to chat with individuals or groups of individuals that are logged in to a variety of different instant messaging applications or social networking websites, of which the user is a member. Therefore, the user could use a single application to chat with any contact appearing on any of the user's contact lists across multiple different IM or social networks.

Though the existing systems and methods establish online interaction using a single application platform, they require an installation of the corresponding messaging application on the user's electronic communication device. Further, they require the users to log-in to all identified social networks and instant messaging networks associated with the user. Therefore, there is a need for an improved system to allow the users to communicate with other users via a messaging, chatting, video call, conference call, or the existing social media platforms of the user without disconnecting the current social media platform or web page running on their browser.

SUMMARY OF THE INVENTION

The present invention discloses a system and method for providing social networking services including, but not limited to, messaging service, group messaging service, video communication service, video conference service, file sharing service. The present invention enables a user to utilize the social networking services without disconnecting the current social media platform or web page. The system is a cross domain network that enables users to communicate within any network sites or web application. The system comprises a server including a processor and a memory having a plugin component or plugin or browser extension executed by the processor. The memory is at least one of volatile memory, non-volatile memory, read only memory (ROM), random access memory (RAM), and flash memory. In one embodiment, the plugin component comprises a registration module, a link generation module, and an instant communication module. The registration module is configured to enable a service provider to create an account by registering one or more credentials. In one embodiment, the system could be a server.

In one embodiment, the link generation module is configured to generate a unique first URL for each registered service provider. In one embodiment, the unique first URL enables a visitor to download the plugin to a visitor device. The visitor device is at least one of tablet computer, personnel computer, personnel digital assistant, smart phone, smart television, palm top, phablet, laptop, or a device with computational capability connected to the internet. In one embodiment, the link generator module further generates a second URL to initiate one or more social networking services. The one or more social networking services include, but not limited to, a live video conferencing service, a messaging service, a group messaging service and a file sharing service.

In one embodiment, the instant communication module is configured to display the interface of the one or more social networking services over a web application being executed on a service provider device and the visitor device as a package of the web application. The instant communication module enables the service provider to communicate with one or more visitors of the web application via the one or more social networking services and generate an audio-visual alert as an indication of presence of a visitor as it happens.

The one or more social networking services include, but not limited to, a built-in, live video conferencing service, a messaging service, a group messaging service, and a file sharing service. In one embodiment, the instant communication module is further configured to display the interface of the one or more social networking services over a mobile application being executed on the service provider device as the package of the mobile application.

In one embodiment, the instant communication module is configured to enable the service provider to communicate and respond to incoming messages, with the visitors by just clicking on the browser extension and without exiting from the web application being executed on the service provider device. In one embodiment, the visitor devices, service provider, and the server are in communication via a communication network. The visitor devices are at least one of a tablet computer, personnel computer, personnel digital assistant, smart phone, smart television, palm top, phablet, laptop, or a device with computational capability connected to the internet. The service provider is at least one of a tablet computer, personnel computer, personnel digital assistant, smart phone, smart television, palm top, phablet, laptop, or a device with computational capability connected to the internet. In some embodiments, the communication network is at least one of a Local Area Network, a Wide Area Network, a Wireless Network, a telecommunication network, a mobile network, and an Internet.

In one embodiment, a method for providing social networking services incorporated in a system comprises a server having a processor and a memory. The memory comprises a set of instructions executable by the processor. The memory is at least one of a volatile memory, non-volatile memory, read only memory (ROM), random access memory (RAM), and flash memory. In one embodiment, the method comprises the following steps to provide social networking services. At one step, a unique first URL and a second URL are generated at the server for a service provider registered with a plugin component or plugin. At another step, the first URL and the second URL are shared in one or more social media services at a service provider device. The service provider device is at least one of a tablet computer, personnel computer, personnel digital assistant, smart phone, smart television, palm top, phablet, laptop, or a device with computational capability connected to the internet.

At another step, and for users who prefer to use a plugin that will operate in the background and browser extension, the first URL enables the one or more visitors to download the plugin at the server. At another step, the second URL enables the one or more visitors to communicate with the service provider at the server. In one embodiment, the step of enabling visitors to communicate with the service provider comprises the following steps. At one step, the visitor devices are checked for the installation of the plugin. At another step, the server sends a direct request to initiate the communication via the social networking services. At another step, the visitor devices accept the direct request to initiate the communication via the social networking services. At another step, the interface of the social networking services is displayed over a web application. In one embodiment, the web application is executed on a service provider device of the service provider and visitor device associated with each visitor as a package of the web application.

In one embodiment, the visitors communicate with the service providers via one or more social networking services. The social networking services include, but not limited to, a live video conferencing service, a messaging service, a group messaging service, and a file sharing service. In one embodiment, the visitor devices, the service provider, and the server are in communication via a communication network. The visitor devices are at least one of a tablet computer, personnel computer, personnel digital assistant, smart phone, smart television, palm top, phablet, laptop, or a device with computational capability connected to the internet. The service provider device is at least one of a tablet computer, personnel computer, personnel digital assistant, smart phone, smart television, palm top, phablet, laptop, or a device with computational capability connected to the internet. The communication network is at least one of a Local Area Network, a Wide Area Network, a Wireless Network, a telecommunication network, a mobile network, and an Internet.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which:

FIG. 8 exemplarily illustrates a flowchart of a method for initiating video conference, according to an embodiment of the present invention.

FIG. 12 exemplarily illustrates a screenshot of a user interface displayed to the service provider before initiating the social networking service, according to an embodiment of the present invention.

FIG. 13 exemplarily illustrates a screenshot of a user interface comprising icons to initiate one or more social networking services, according to an embodiment of the present invention.

FIG. 24 exemplarily illustrates a screenshot of a user interface displaying a health summary-master associated with the user profile to collect user signature, according to one embodiment of the present invention.

FIG. 25 exemplarily illustrates a screenshot of a user interface to assist users, according to one embodiment of the present invention.

FIG. 34, exemplarily illustrates a screenshot of the user interface displayed a calendar associated with the user profile, according to one embodiment of the present invention.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a system and method for providing enhanced social networking services including, but not limited to, messaging service, group messaging service, video communication service, video conference service, file sharing and data collection services. The present invention enables a user to utilize the social networking services without disconnecting the current social media platform or web page. The system is a cross domain network that empowers any application, social networks, medical record system, application and workflow with instant built in live collaboration tools, so these tools operate on top of the application and looks like they are part and parcel of the application while in reality code operates from different servers, one is the server of the application and second is the server of Live networks.

Figure 1:
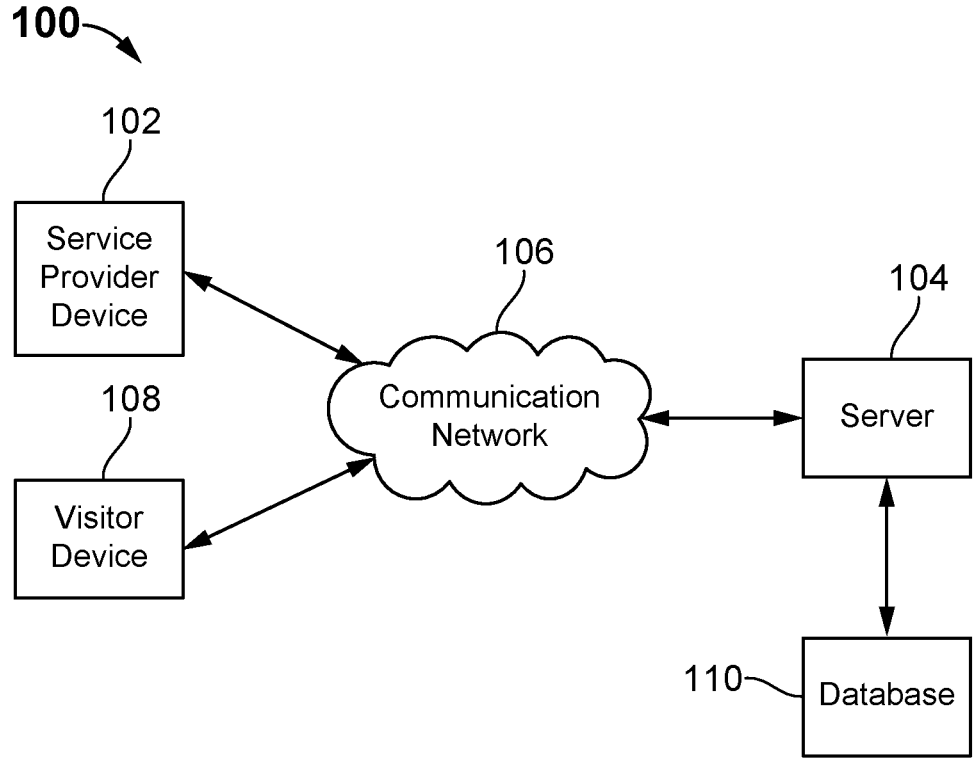
FIG. 1 exemplarily illustrates an environment of a system for providing social networking services, according to an embodiment of the present invention.

FIG. 1 exemplarily illustrates an environment 100 of a system for providing social networking services, according to an embodiment of the present invention. The environment includes a service provider device 102, a visitor device 108, a set of servers, e.g., server 104, and a database 110, which are coupled directly or indirectly to a communication network 106.

In one embodiment, the database 110 may be accessible by the server 104. The database 110 may be integrated into the server 104 or separate from it. In some embodiments, the database 110 resides in the connected server 104 or a cloud computing service. Regardless of location, the database 110 comprises a memory to store and organize certain data for use by the server 104.

In an embodiment, the network 106 could be Wi-Fi network, WiMax network, and wireless local area network. In one embodiment, the server 104 is at least one of a general or special purpose computer. The server 104 could be operated as a single computer, which can be a hardware and/or software server, a workstation, a desktop, a laptop, a tablet, a mobile phone, a mainframe, a supercomputer, a server farm, and so forth. In some embodiments, the computer could be touchscreen and/or non-touchscreen and adopted to run on any type of OS, such as iOS™, Windows™, Android™, Unix™, Linux™ and/or others. In one embodiment, the plurality of computers is in communication with each other, via networks. Such communication can be via a software application, a mobile app, a browser, an OS, and/or any combination.

Figure 2:
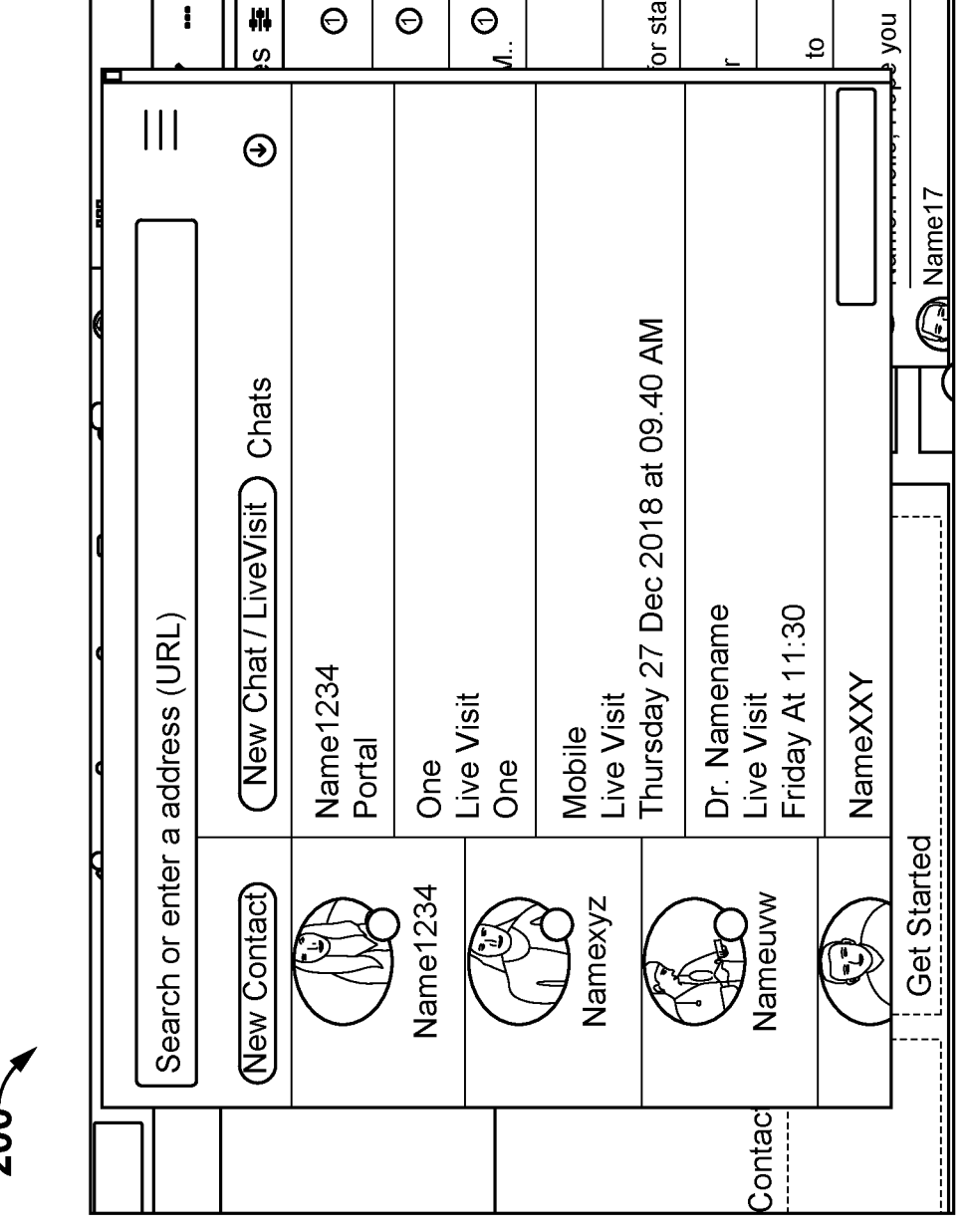
FIG. 2 exemplarily illustrates a screenshot of a browser extension control panel for a live indication of presence of visitors and enable a user to initiate communication with listed contacts while working with any application, according to an embodiment of the present invention.

The service provider device 102 includes a web application running within a web browser, and the server 104 includes a software module to execute function of modules including a registration module 206, a link generation module 208, and an instant communication module 210 (shown in FIG. 2). In one embodiment, the software module could be at least one of a plugin or a browser extension.

The service provider device 102 could be any type of electronic device that provides one or more services or functions to a service provider. In one embodiment, the service provider device 102 is configured to operate as at least one of a desktop, a laptop, a tablet, a mobile phone, and mobile and/or handheld electronic devices. The service provider device 102 includes an operating system that hat coordinates the use of hardware and software resources on service provider device 102, as well as one or more applications (e.g., web browser, web application) that perform specialized tasks for the service provider. The service provider device 102 includes functionality to obtain and/or execute applications using the communication network 106. The service provider device 102 obtains the plugin from the server 104 and load the plugin in the web application.

The visitor device 108 could be any type of electronic device that provides one or more services or functions to a visitor. In one embodiment, the visitor device 108 is configured to operate as at least one of a desktop, a laptop, a tablet, a mobile phone, and mobile and/or handheld electronic devices. The visitor device 108 includes an operating system that hat coordinates the use of hardware and software resources on visitor device 108, as well as one or more applications (e.g., web browser, web application) that perform specialized tasks for the visitor. The visitor device 108 includes functionality to obtain and/or execute applications using the communication network 106. The visitor device 108 obtains the plugin from the server 104 and load the plugin in the web application. In one embodiment, the system could be a server.

The service provider refers to physician, nurse, or any person who is subscribed to the social networking services offered by the system. The visitor refers to any person who visits the social media page of the service provider or any person who visits any websites.

Referring to FIG. 2, a screenshot 200 of a browser extension control panel for a live indication of presence of visitors and enable a user to initiate communication with the listed contacts while working with any application, according to an embodiment of the present invention. In one embodiment, the browser extension control panel could display a live indication of presence of visitors and the system could enable the user to initiate communication with the listed contacts while working with any application as well as social networks such as, but not limited to, LinkedIn®, Twitter, and Facebook®, etc. The user could activate video conferencing, chat, scheduling, and forms on top of any application. In one embodiment, the browser extension could provide indications of incoming new messages in real time and the user could respond to these messages without needing to start any other application. The user could also initiate a live video and chat with a person from list of contacts, without leaving the application. The user could also create, modify, and update the his or her portal with the chat, video, scheduling, and forms without any code modification and also update texts, images, and links, etc. The user could also receive audio visual alerts about the presence of the visitors or attendees as it happens.

In one embodiment, the system activates a live video conferencing, chat, data collection, and scheduling modules upon the visitor clicking on that link. In one embodiment, the system could enable the user to quickly respond to a message while working with any application by clicking on the incoming message and also enable to invite the listed contacts to join the conversation and turn the chat to a live video conferencing by pressing a single button. All without the need to quit the system they are working on and login to a designated system for the live collaboration.

Figure 3:
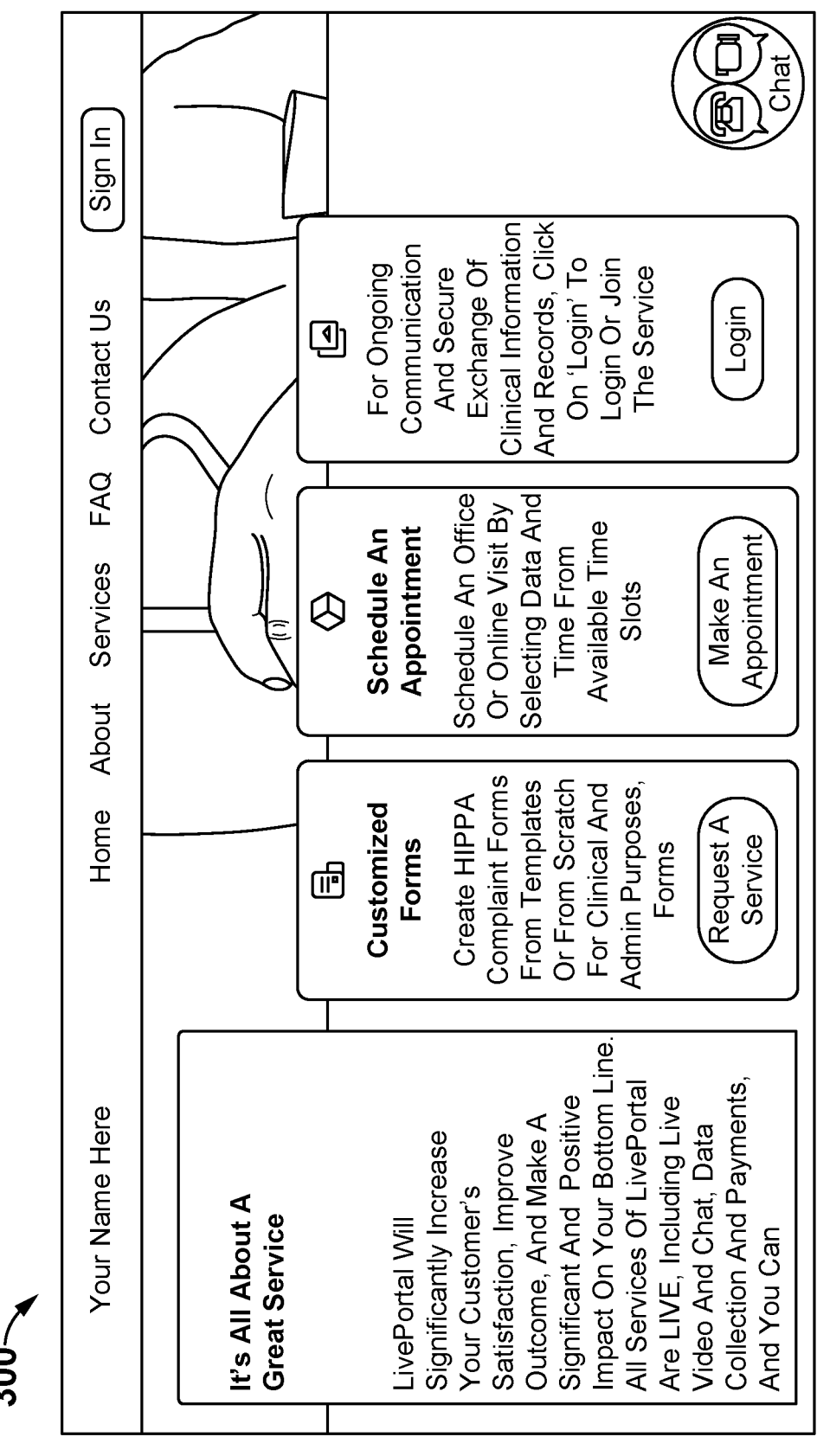
FIG. 3 exemplarily illustrates a a screenshot 300 of a user interface of a service provider portal, according to one embodiment of the present invention.

Referring to FIG. 3, exemplarily illustrates a screenshot 300 of a user interface of a service provider portal, according to one embodiment of the present invention. In one embodiment, the user interface allows the user to signing in or register into the portal by providing one or more user credentials such as user name, email ID, date of birth (DOB), and password. Upon successful signing in, the system creates a separate user account. By clicking 'Login', the user interface allows the user to join for the ongoing communication and secure exchange of clinical information and records. In addition, the user interface has one or more features include 'Request A Service' and 'Make an Appointment'. In one embodiment, the user interface allows the user to create customized forms by clicking 'Request A Service'. The user interface allows the user to create HIPAA compliant forms from templates or scratch for clinical and admin purposes. In one embodiment, the user interface also allows the user to schedule an appointment by clicking 'Make an Appointment'. The user interface allows the user schedule an offline or online visit by selecting date and time from available time slots.

Figure 4:
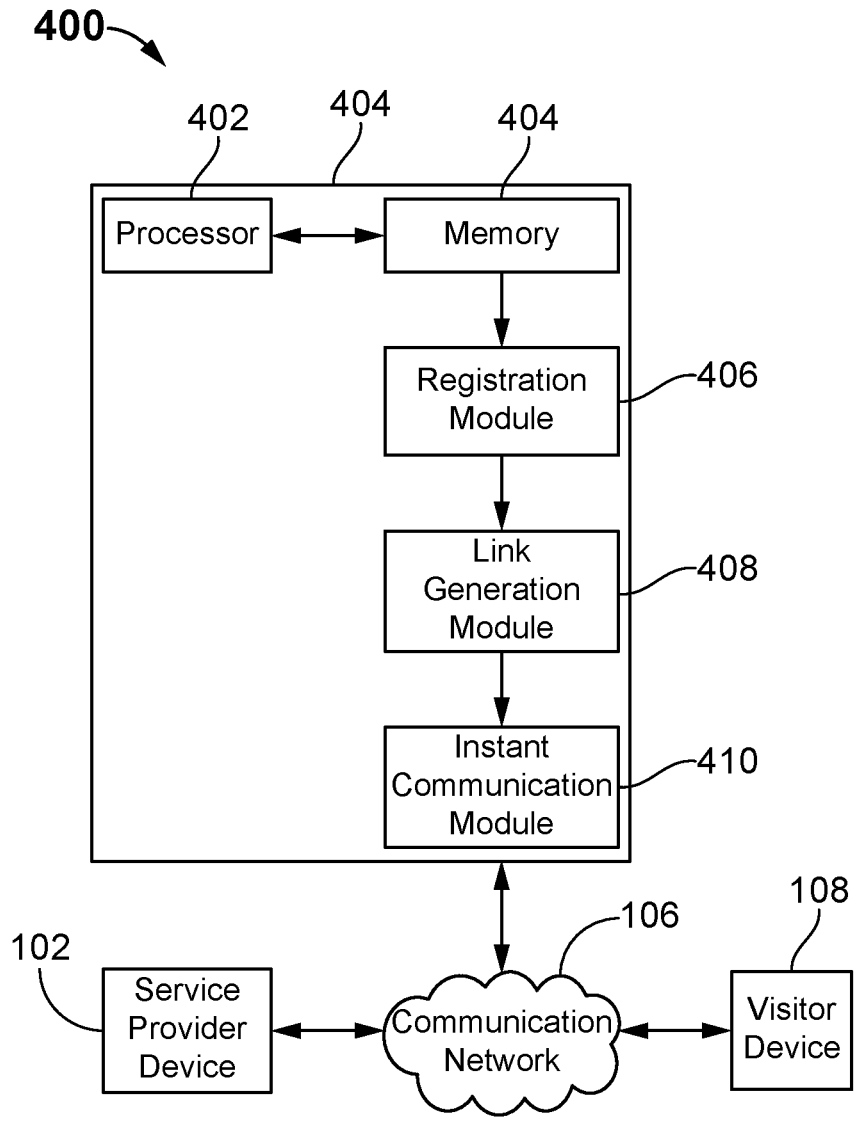
FIG. 4 exemplarily illustrates a block diagram of a server, according to an embodiment of the present invention.

Referring to FIG. 4, a block diagram 400 the server 104 includes a processor 402 and a memory 404. The memory 404 includes the plugin or set of instructions to execute function of modules including a registration module 406, a link generation module 408, and an instant communication module 410. The processor 402 executes the instructions stored by the memory 404.

The registration module 406, executed at the processor 402, is configured to enable the service provider to create an account by registering one or more credentials. The link generation module 408, executed at the processor 402, configured to: generate a unique first URL for each registered service provider, and generate a second URL to initiate one or more social networking services.

The instant communication module 410, executed at the processor 402, is configured to: display the interface of the one or more social networking services over the web application being executed on the service provider device 102 as a package of the web application; and enable the service provider to communicate with one or more visitors of the web application via the one or more social networking services. In one embodiment, the instant communication module 410 is configured to display the interface of the one or more social networking services over a mobile application being executed on the service provider device 102 as the package of the mobile application. The instant communication module 410 is configured to enable the service provider to communicate with the visitors without exiting from the web application being executed on the service provider device 102.

In one embodiment, the web application, includes, but not limited to, medical record system, as well as social networks such as LinkedIn® and Facebook®. In one embodiment, the social networking services including, but not limited to, messaging service, group messaging service, video communication service, video conference service, file sharing service. The instant communication module 410 is configured to enable the service provider to use the social networking services within the hosting web application. As a result, the present invention enables the service provider to launch any social networking services without exiting the web application.

In one embodiment, a method for providing social networking services is incorporated in a system comprises a server with a processor and a memory unit, a database in communication with the server for storing information for use by the server, a user device/service provider device configured to access the server via a communication network, and a visitor device in communication with the communication network. The server comprises downloadable plugin for use by the service provider device and the visitor device. At one step, a first URL is generated for the service provider registered to with the plugin. A second URL could be generated by the service provider to initiate the social networking services such as group chat. The social networking services provided by the system of the present invention are secure and HIPAA complaints.

Figure 5:
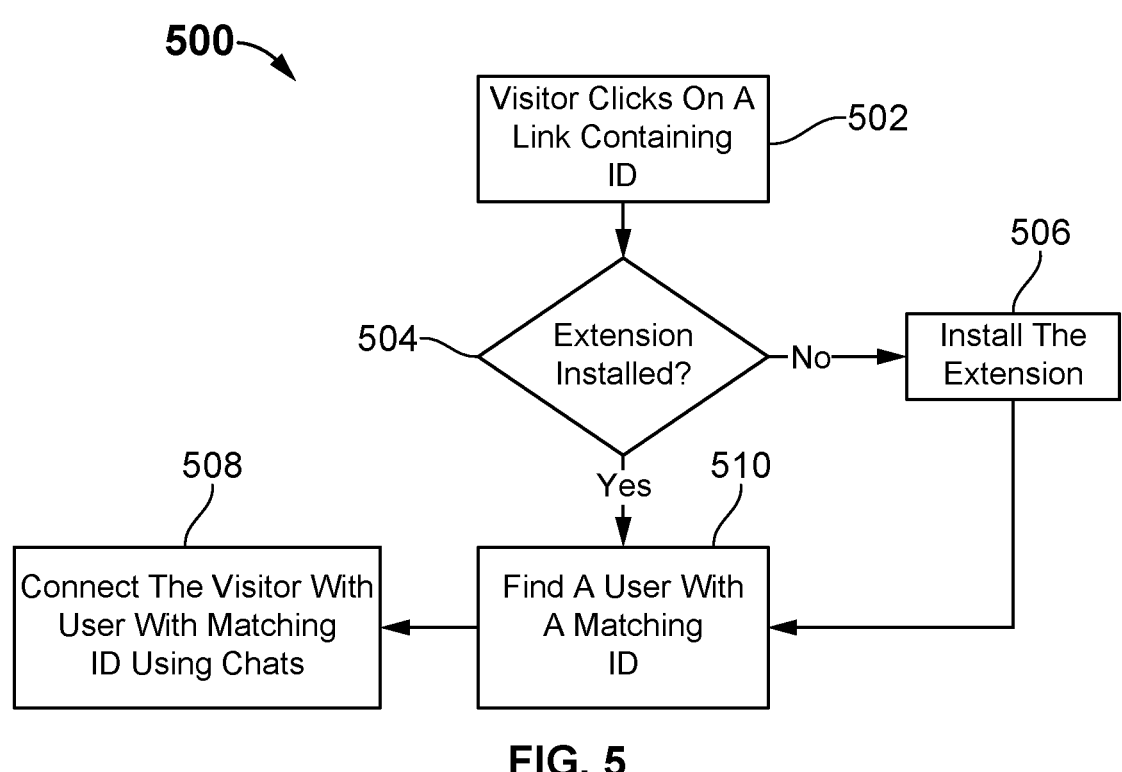
FIG. 5 exemplarily illustrates a flowchart of a method for utilizing a first URL to subscribe to the social networking services, according to an embodiment of the present invention.

FIG. 5 exemplarily illustrates a flowchart 500 of a method for utilizing a first link or a first unique URL to subscribe to the social networking services, according to an embodiment of the present invention. The system includes a service provider device associated with a service provider, a visitor device associated with a visitor, a server having a plugin, and a database, which are coupled directly or indirectly to a communication network.

At step 502, a registered service provider shares his or her first unique link in his or her web application. The visitor of the web application clicks the first unique link containing an ID. At step 504, the visitor device is checked, if the plugin or plugin extension is installed. At step 506, the visitor is prompted to install the extension on the absence of the plugin extension in the visitor device. At step 510, the system finds the service provider with a matching ID, if the visitor device is installed with the plugin extension. At step 508, the visitor is connected to the service provider having a matching ID via chat.

Figure 6:
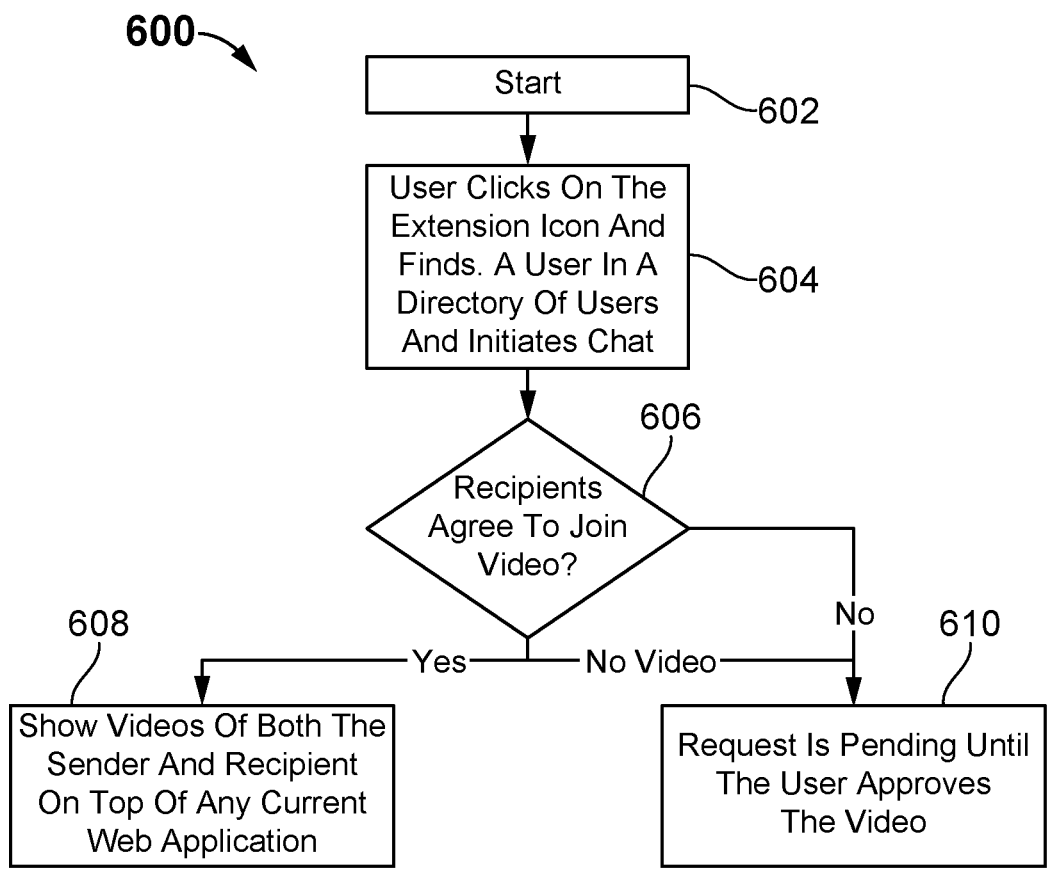
FIG. 6 exemplarily illustrates a flowchart of a method for initiating video chat between at least two users subscribed to use social networking services, according to an embodiment of the present invention.

FIG. 6 exemplarily illustrates a flowchart 600 of a method for initiating video chat between at least two users subscribed to use social networking services, according to an embodiment of the present invention.

The system includes a service provider device associated with a service provider, a visitor device associated with a visitor, a server having a plugin, and a database, which are coupled directly or indirectly to a communication network.

At step 602, the method for initiating video chat between at least two users subscribed to use social networking services starts. At step 604, the service provider or visitor or user who installed plugin clicks on the plugin. The user is directed to a page comprising directory of users and the user initiates video chat. At step 606, the system prompts the recipients to join the chat. At step 610, if the recipient rejects the request for joining the chat, the request is marked as pending until the recipient approves or agrees to join the video chat. At step 608, if the recipient agrees to join the video chat, the system opens the video communication interface for both the user who sent the request and the recipient who agreed to join the chat on top of any web application running on their device.

Figure 7:
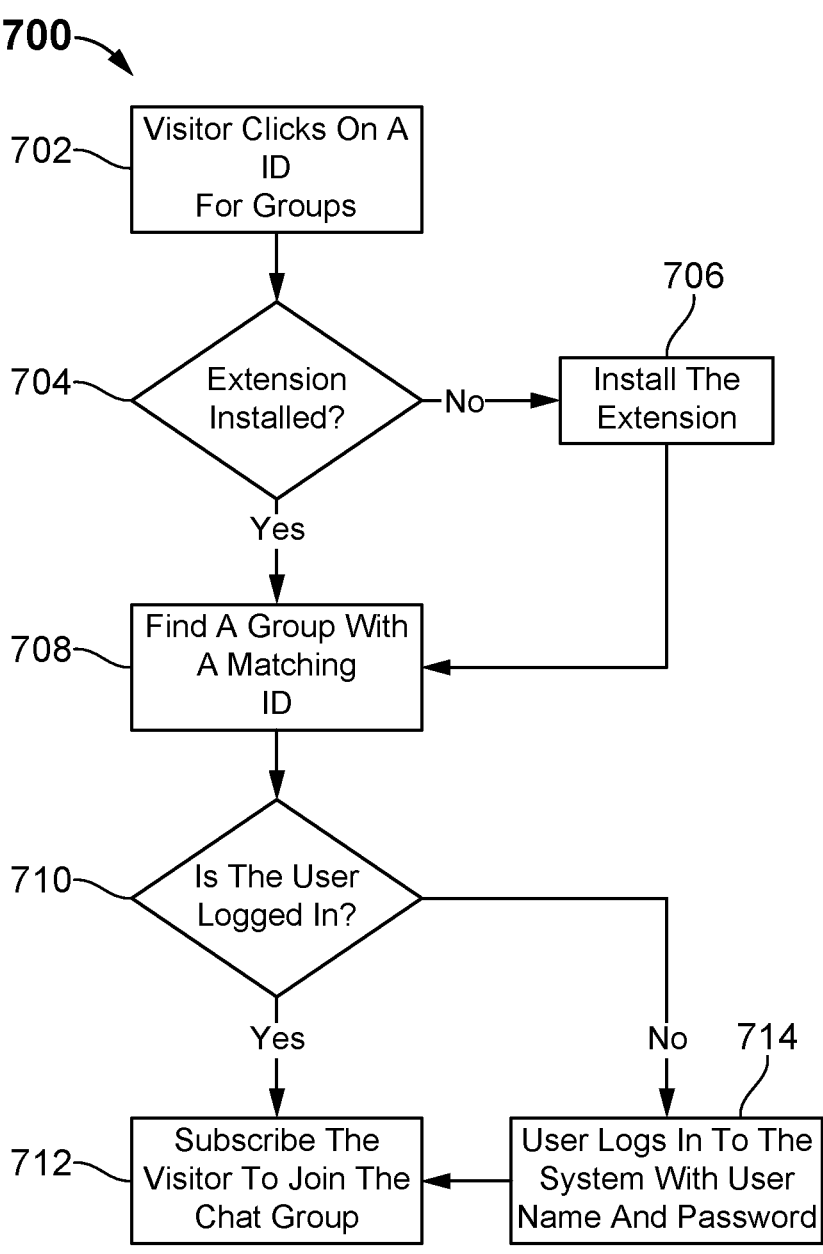
FIG. 7 exemplarily illustrates a flowchart of a method for initiating group chat, according to an embodiment of the present invention.

FIG. 7 exemplarily illustrates a flowchart 700 of a method for initiating group chat, according to an embodiment of the present invention. The system includes a service provider device associated with a service provider, a visitor device associated with a visitor, a server having a plugin, and a database, which are coupled directly or indirectly to a communication network. At step 702, a visitor clicks on a second link shared for group chat. The second link has a unique ID. At step 704, the system or visitor checks if the plugin extension is installed in the visitor device. At step 706, the visitor installs the plugin extension, if the visitor device does have the plugin. At step 708, if the plugin is installed, the system finds the group with matching the unique ID. At step 710, the system checks if the visitor or user is logged in. At step 714, if the user is not logged in, the system prompts the visitor to login with username and password. At step 712, the visitor is enabled to subscribe to join the group chat.

Every message posted to the group is automatically sent to by any member of the group and published to all other members of that group. Individuals who are not subscribed to the group will not be able to read these messages. Therefore, the user must be identified by the user name and password before viewing these messages. During the chat, the user could post a form for a collection of data, payments, and signatures. These forms would be displayed inside the chat. All data collected from visitors and exchanged during the chat or group messaging is secure and HIPAA compliant.

FIG. 8 exemplarily illustrates a flowchart 800 of a method for initiating video conference, according to an embodiment of the present invention. The system includes a service provider device associated with a service provider, a visitor device associated with a visitor, a server having a plugin, and a database, which are coupled directly or indirectly to a communication network. At step 802, the service provider sends a request for one on one chat and group chat. The request includes a unique link for initiating the chat. At step 804, a registered user or registered service provider clicks on the plugin and finds the service provider who sent the request and initiates a chat. At step 806, a visitor clicks on the unique link. At step 810, the system checks if the plugin extension is installed in the visitor device. At step 808, the visitor installs the plugin extension, if the visitor device does have the plugin.

At step 812, if the plugin extension is installed, a direct request is sent to the visitor by chat to join the video conferencing. At step 816, the system checks if the recipients agree to join the video chat. At step 818, if the recipient does not agree, the visitor can leave a message or continue chat only conversation. At step 814, if the recipients agree to join the group chat, the system opens the video communication interface for both the user who sent the request and the recipients who are agreed to join the chat on top of any web application running on their device.

Every message posted to the group is automatically sent to by any member of the group and published to all other members of that group. Individuals who are not subscribed to the group will not be able to read these messages. Therefore, the user must be identified by the user name and password prior to viewing these messages.

Figure 9:
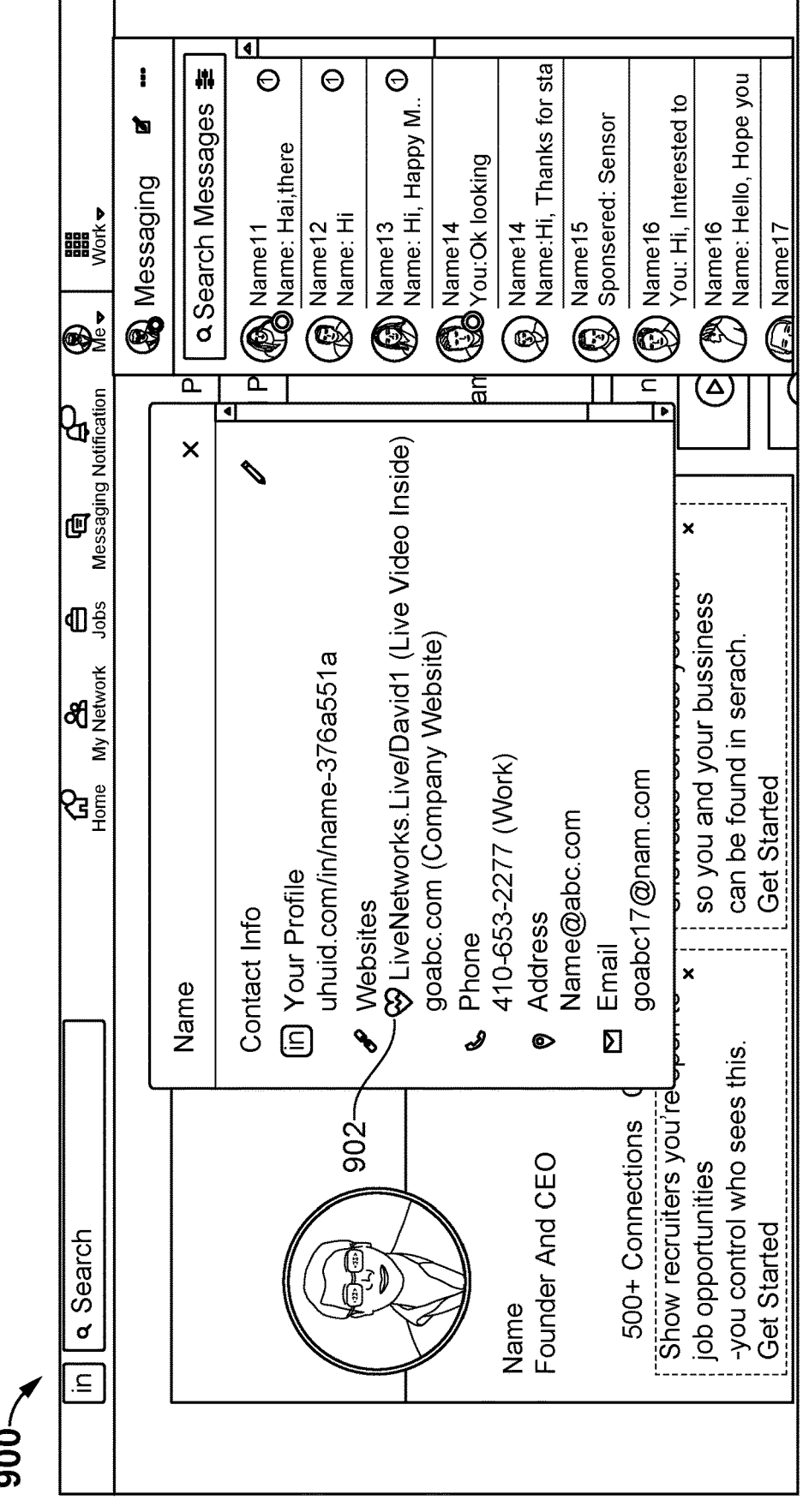
FIG. 9 exemplarily illustrates a screenshot of a profile of a service provider having a first unique URL, according to an embodiment of the present invention.

Referring to FIG. 9 to FIG. 15, a method for initiating one or more social networking services, according to an embodiment of the present invention. FIG. 9 exemplarily illustrates a screenshot 900 of a profile of service provider having a first unique link 902, according to an embodiment of the present invention. As soon as a visitor clicks on that link 902, they would be promoted to install a browser extension. Upon installing the extension, the system automatically identifies the link and changes the color and adds a logo to the link, as shown in a screenshot 900 of FIG. 9. The extension browser (or an installed API) can identify the location of that link 902 anywhere on the screen of any application, and changes to purple color, and add automatically the logo of link 902 for visual identification.

Figure 10:
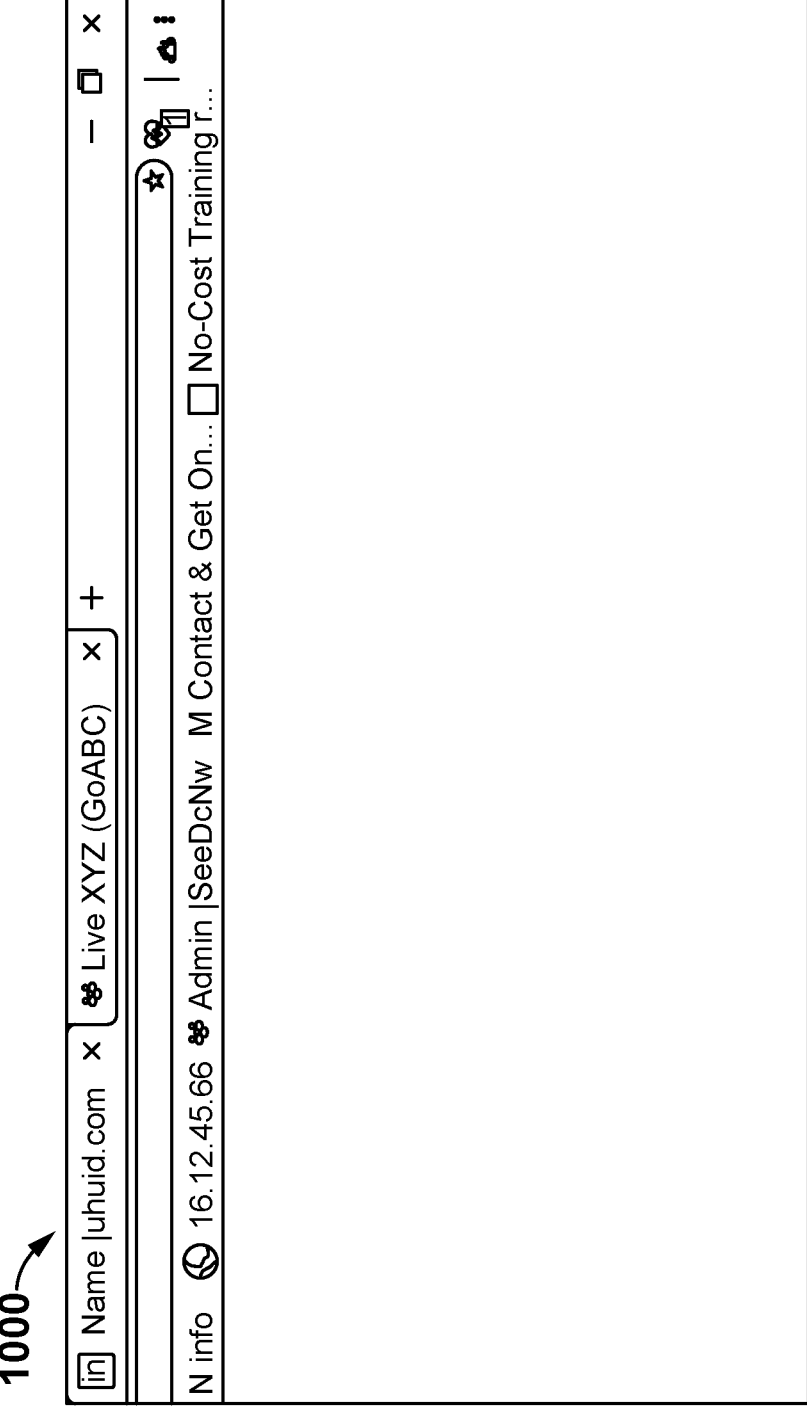
FIG. 10 exemplarily illustrates a screenshot of an icon of plugin extension on a webpage, according to an embodiment of the present invention.
Figure 11:
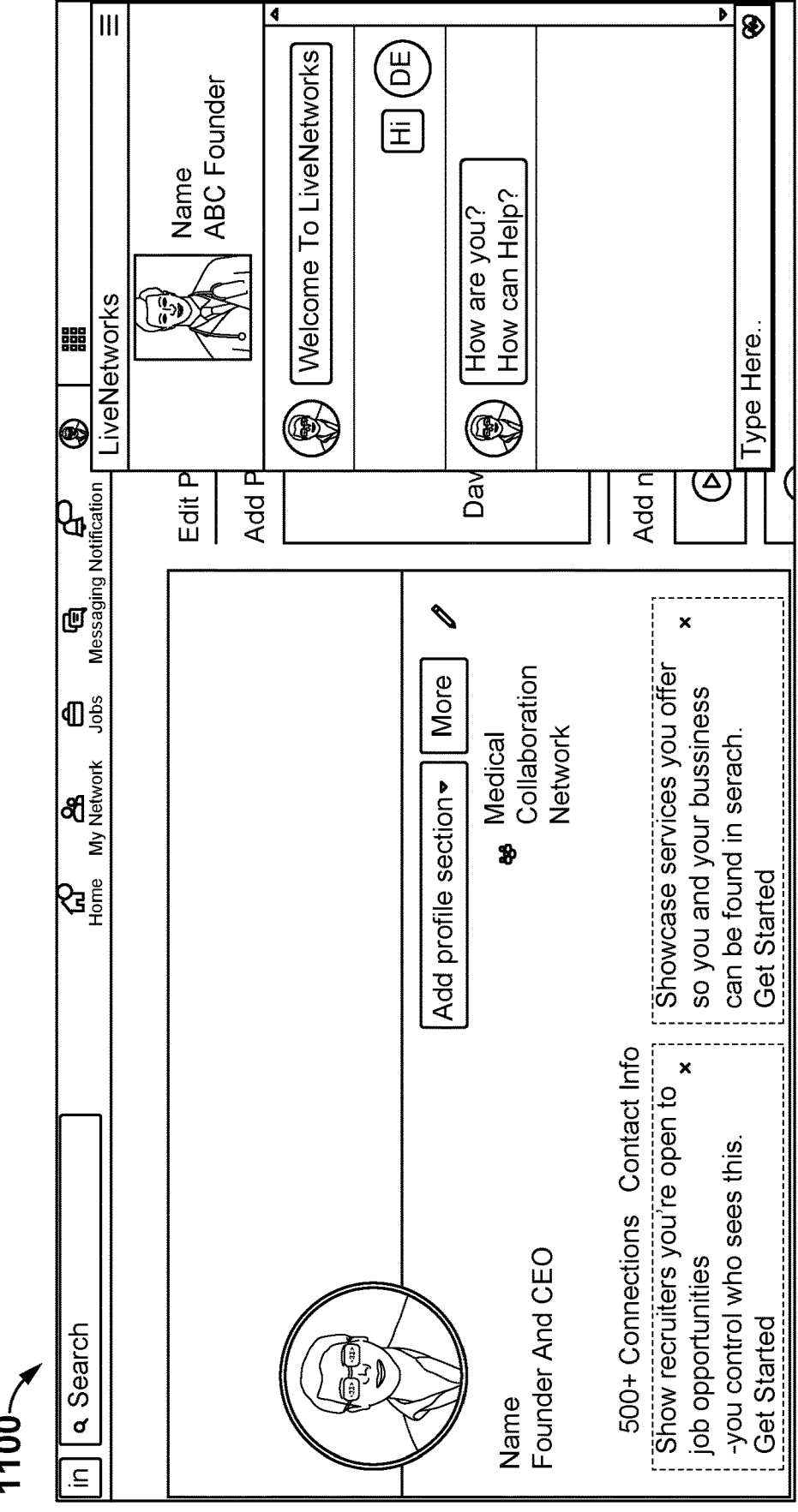
FIG. 11 exemplarily illustrates a screenshot of the service provider communicating with the visitor using a chat service, according to an embodiment of the present invention.

In another embodiment, upon installing the extension there would be a visual indication on the top of the browser indication that the extension is installed and the number of new messages, as shown in a screenshot 1000 of FIG. 10. On clicking the extension and if the visitor has installed the extension, they could use the chat service without leaving the webpage, as shown in a screenshot 1000 of FIG. 11. Further, the user could activate any of chat, video, scheduling services and can continue to use the application in the background as well as the video/chat/service on the same screen. On clicking the extension, the user could view all of their contacts and initiate any of the services.

FIG. 12 exemplarily illustrates a screenshot 1200 of a user interface displayed to the service provider before initiating the social networking service, according to an embodiment of the present invention. FIG. 12, further illustrates, the service provider received a communication request. FIG. 13 exemplarily illustrates a screenshot 1300 of a user interface comprising icons to initiate one or more social networking services, according to an embodiment of the present invention. The service provider could initiate the communication service by clicking on the video chat or messaging icon.

Figure 14:
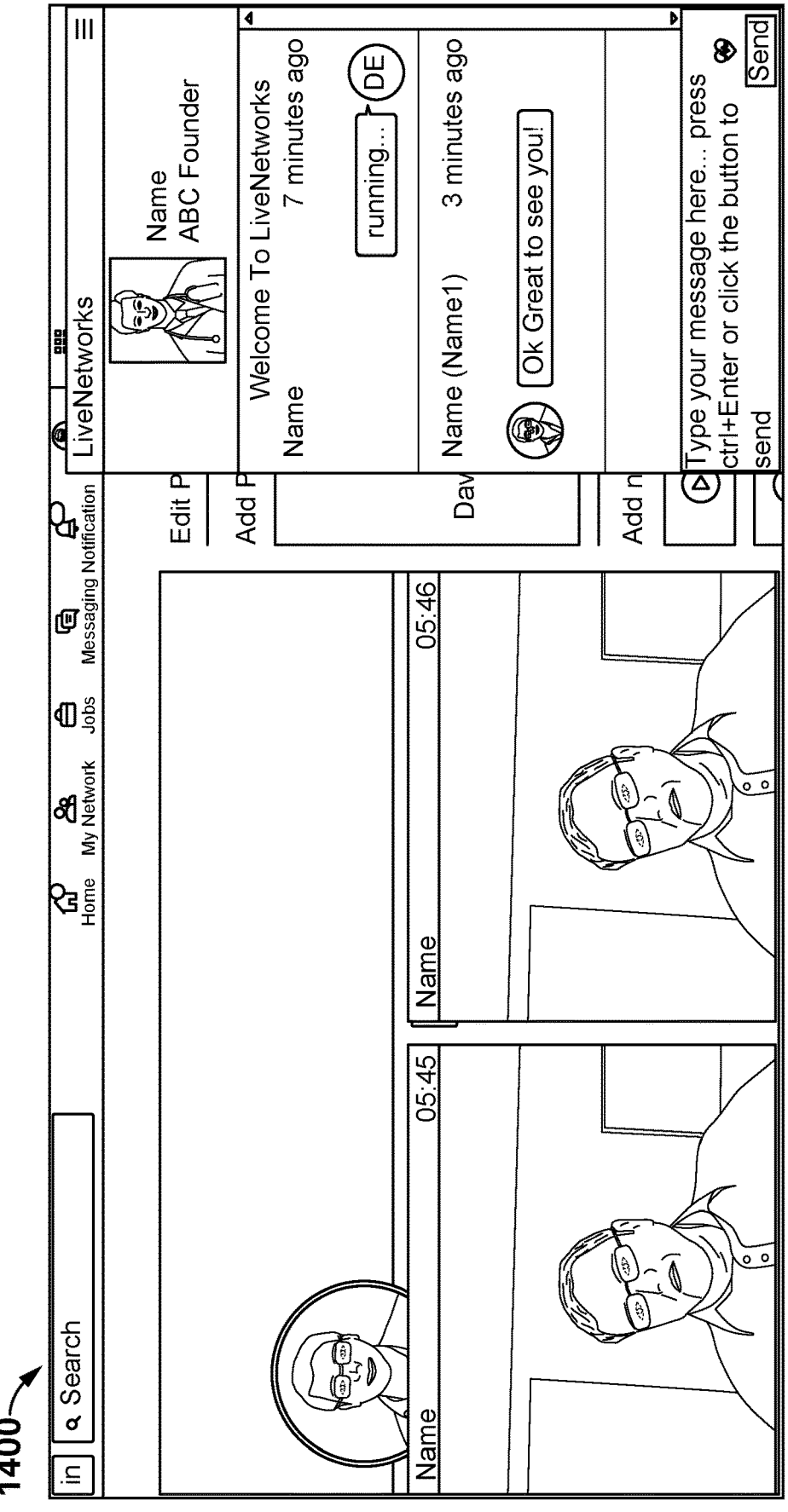
FIG. 14 exemplarily illustrates a screenshot of the service provider communicating with the visitor, in LinkedIn service as an example, and video conferencing and chat takes place within the same screen of LinkedIn, using a video chat service, according to an embodiment of the present invention.

FIG. 14 exemplarily illustrates a screenshot 1400 of the service provider communicating with the visitor using a video chat service, according to an embodiment of the present invention. On clicking the link shared by the sender, the system displays the video chat interface automatically.

Figure 15:
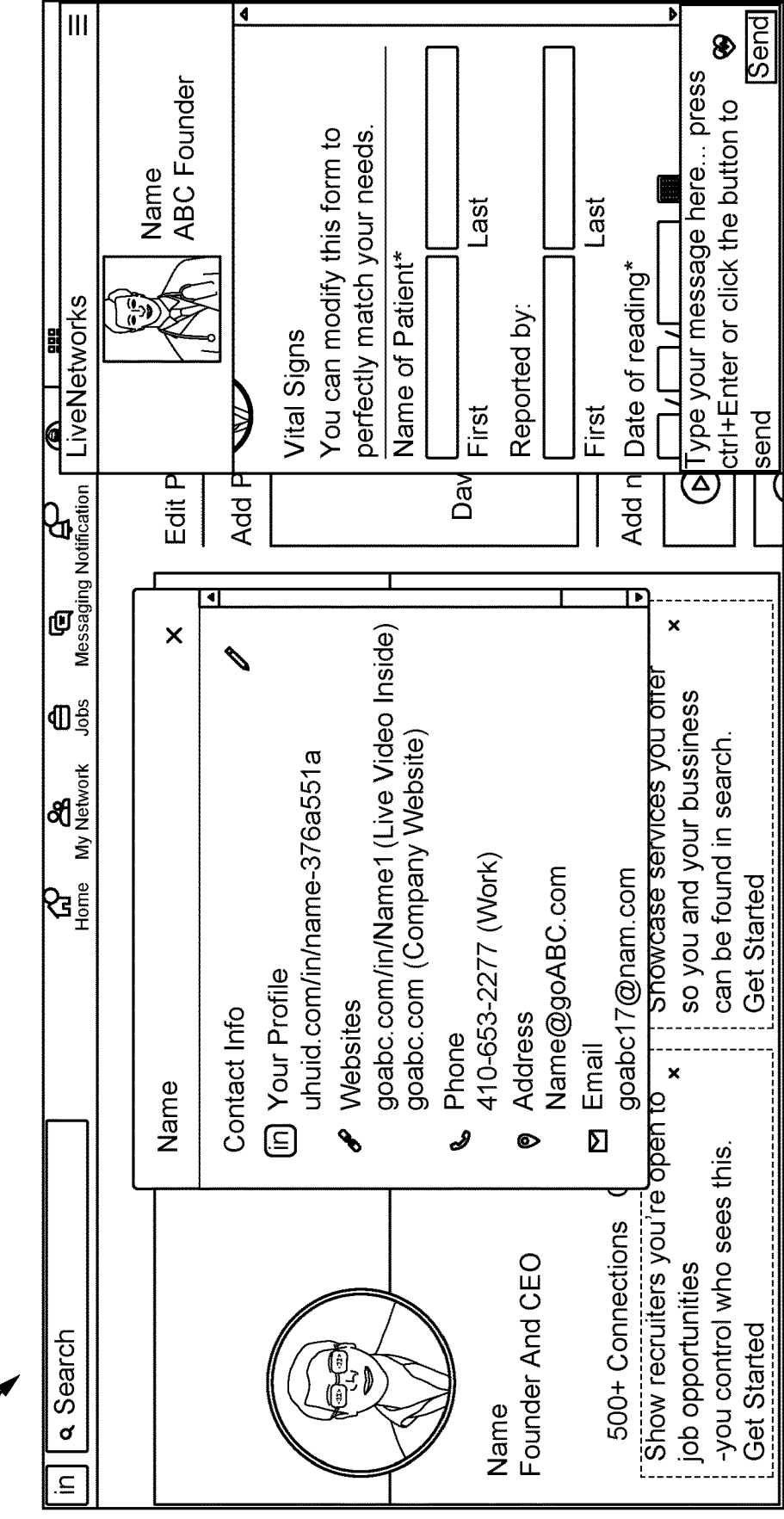
FIG. 15 exemplarily illustrates a screenshot of a form being presented to collect data, according to an embodiment of the present invention.

FIG. 15 exemplarily illustrates a screenshot 1500 of a form being shared to collect data, according to an embodiment of the present invention. The form is posted to the chat by one party and the recipient fills the form requesting a service making a payment, entering clinical data, sign or make a payment. The present invention empowers any web application or web service with services of one on one chat or a group chat without any code modification.

The system is a cross domain network that enables users to communicate within any network sites or web application, which is further described as follows with exemplarily screenshots. Initially, the user has to install a browser extension or a software plugin of the system. At another step, a first unique URL/a unique ID is assigned to each registered user. The link could be included with his/her email signature, any social media network or as part of a message is in any website or application. The browser extension/software plugin identifies the URL anywhere in the screen and modifies to include a different color such as pink and a logo such as a heart.

The system could be used in any real-life situations, for example, the network integrating a physician and a patient.

Figure 16:
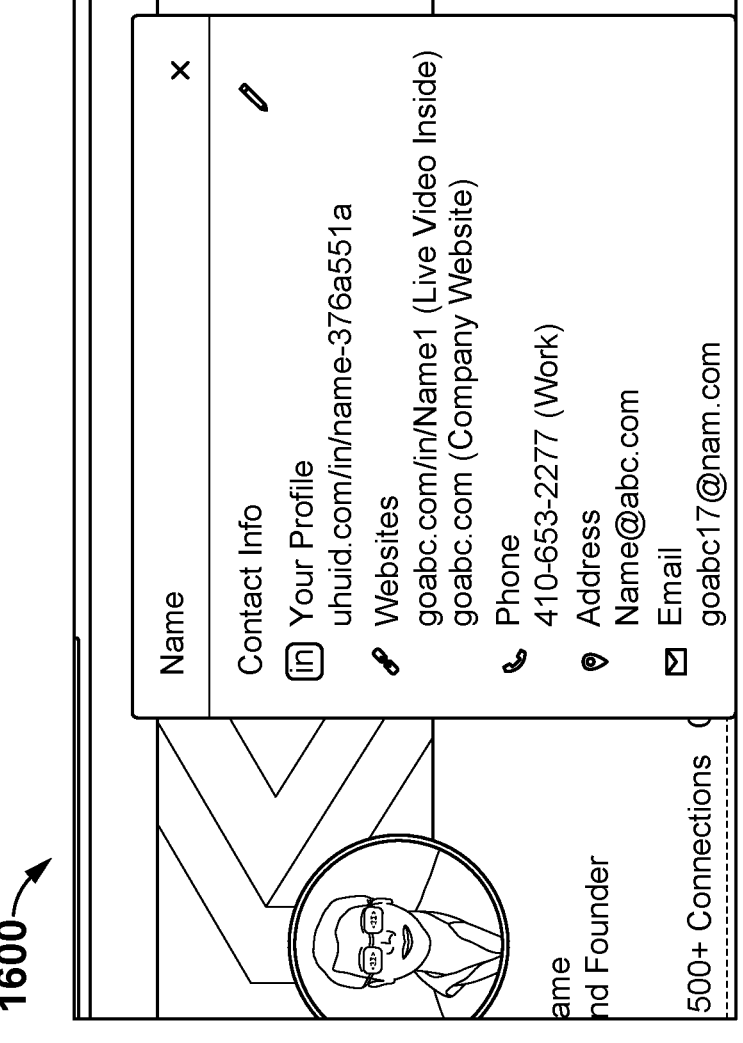
FIG. 16 exemplarily illustrates a screenshot of a user interface displaying a unique URL, according to an embodiment of the present invention.
Figure 17:
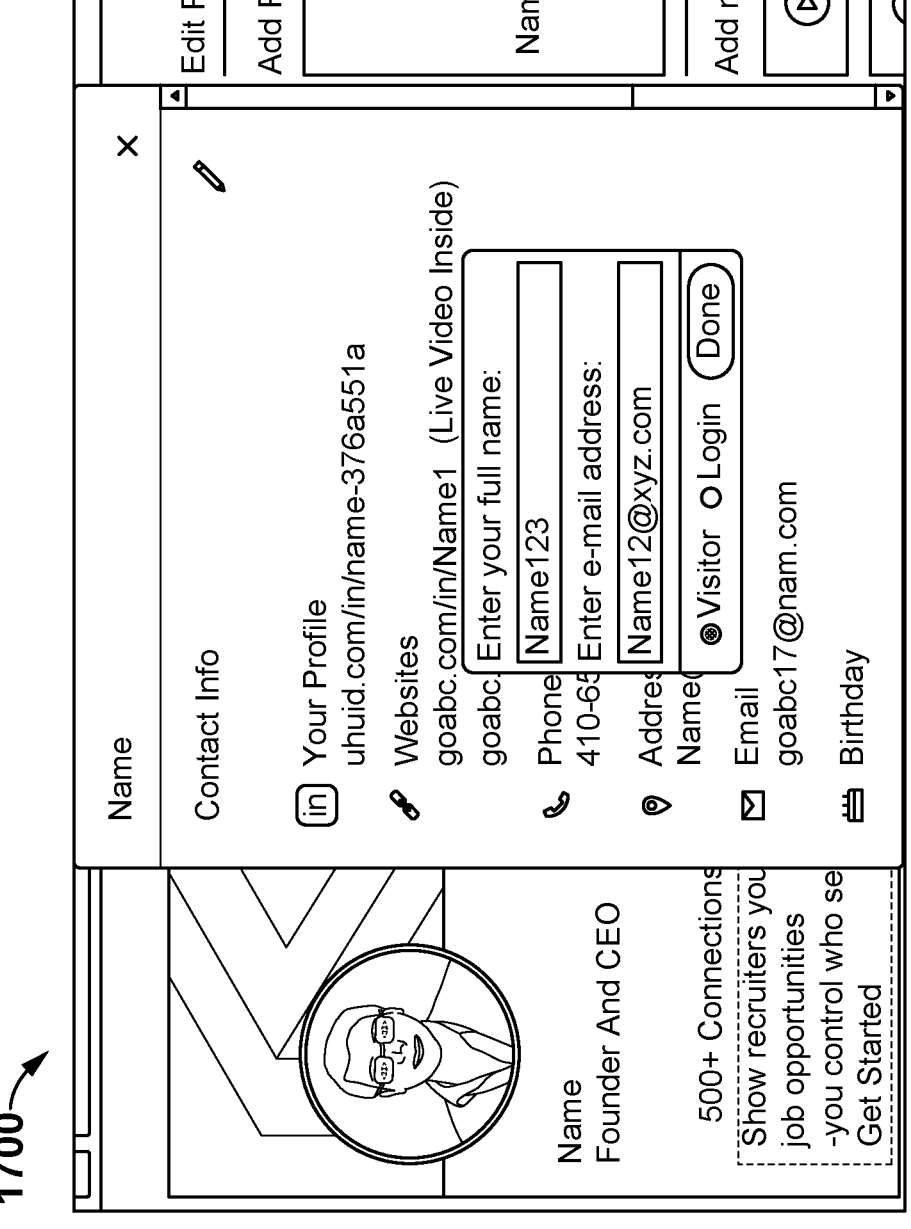
FIG. 17 exemplarily illustrates a screenshot of a user interface displaying a pop-up box on clicking the URL, according to an embodiment of the present invention.

Consider a patient comes across a URL of the physician, as shown in a screenshot 1600 of FIG. 16. Upon clicking the link of the physician, a pop-up box requesting name and email address is displayed to the patient. Name and email address are need to be entered in the pop-up box to connect with the physician, as shown in a screenshot 1700 of FIG. 17.

Figure 18:
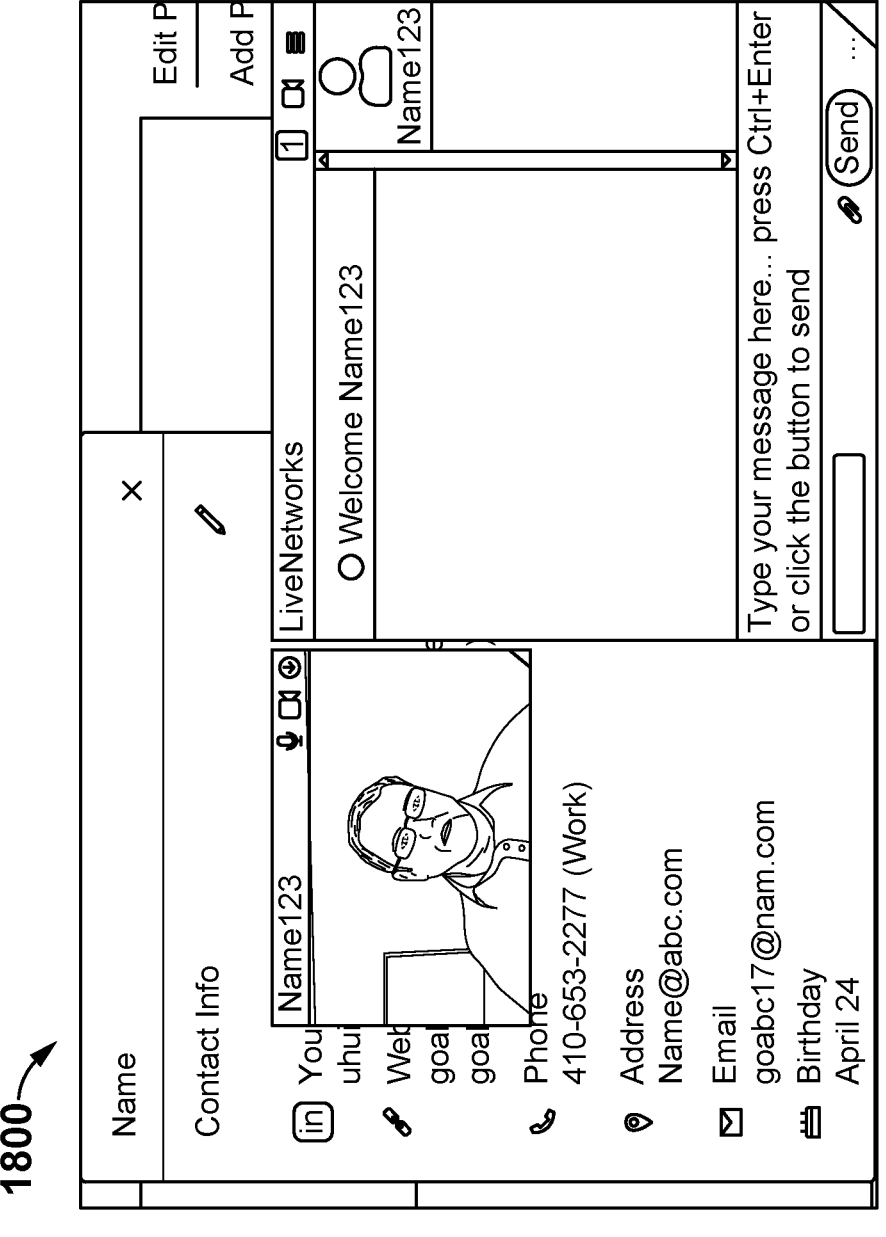
FIG. 18 exemplarily illustrates a screenshot of a user interface that allows chat or video communication, according to an embodiment of the present invention.

If the patient has options to enter username and password, the patient could input the requested data to view all the recent messages they received using the installed extension or the plugin software. The physician could also communicate both using chat and video communication, as shown in a screenshot 1800 of FIG. 18. This entire process happens entirely on the same screen or application in which the link has been activated, without ever leaving the application from which the link has been activated and without any code notifications.

Figure 19:
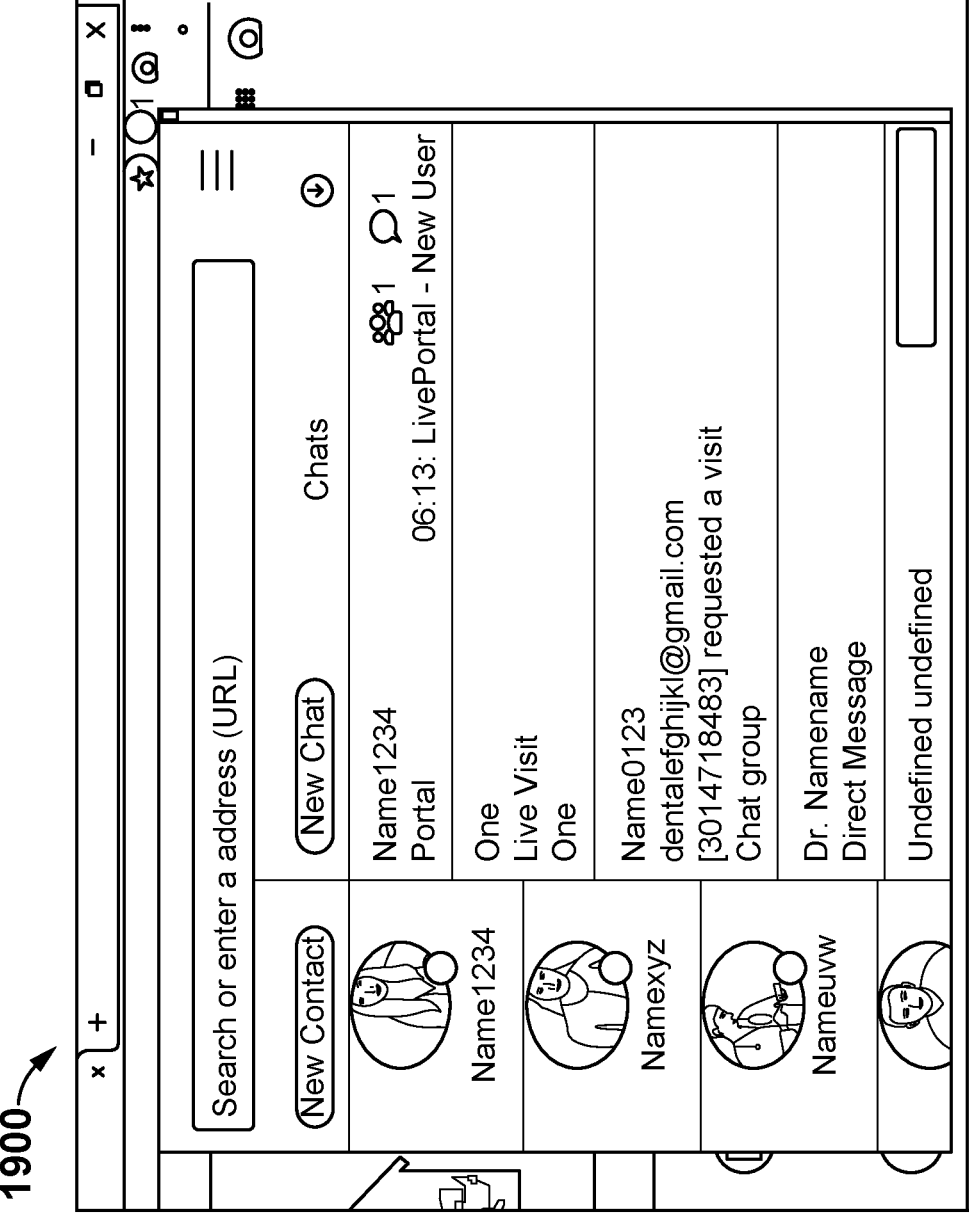
FIG. 19 exemplarily illustrates a screenshot of a user interface displaying notification sent to the physician on accessing the URL by the patient, according to an embodiment of the present invention.

Further, the physician receives an audio alert from the browser extension notifying that a new patient just clicked the URL. The physician could click on the entry of visitors or patients and join the conversion, as shown in a screenshot 1900 of FIG. 19. The system could be incorporated as a part and parcel of any work flow. The system enables users to send and receive messages and instant communication, regardless of the application being executed. The system is particularly useful for industries such as Healthcare in finance where rapid response is required.

EXAMPLE

Figure 20:
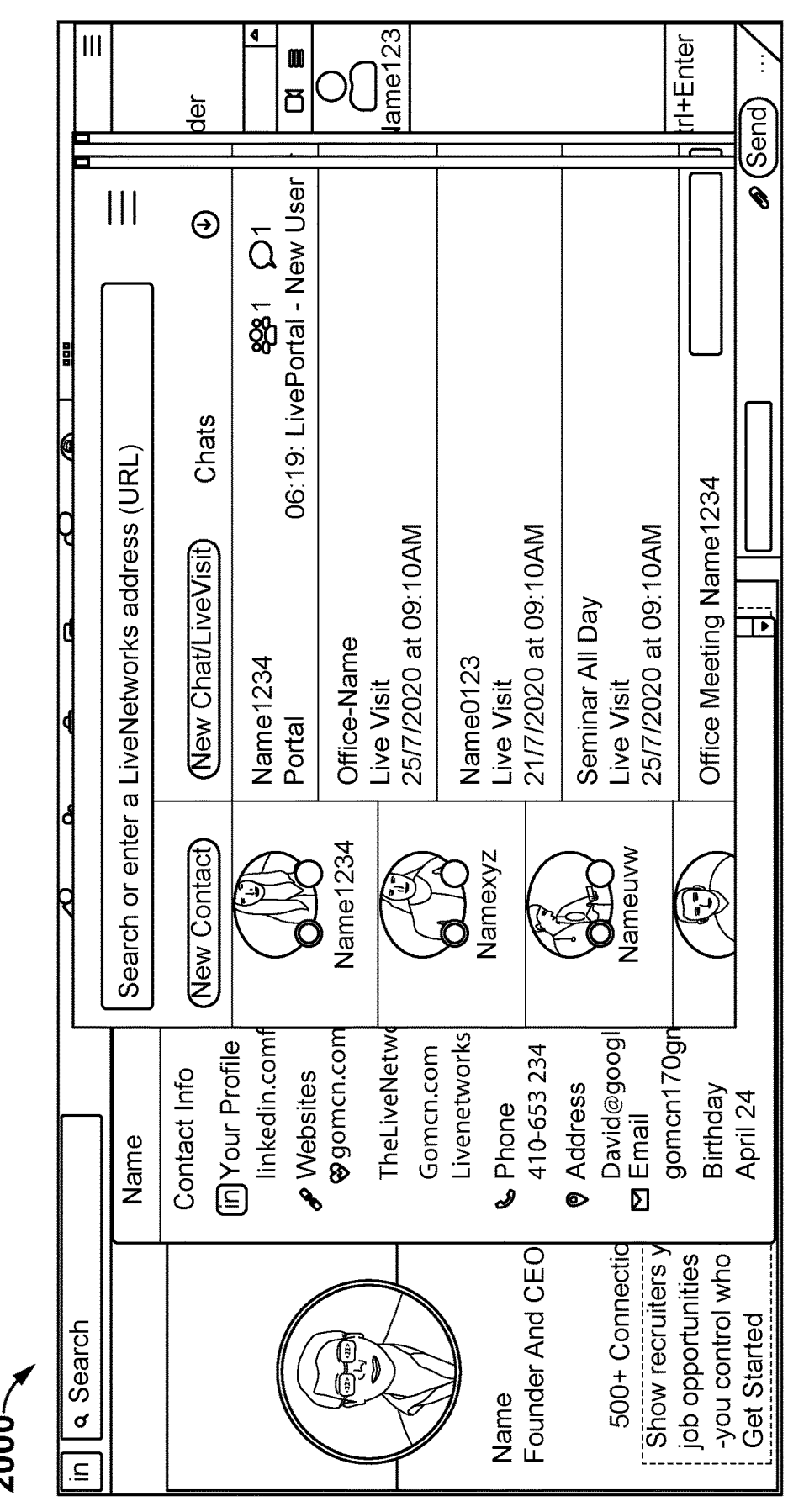
FIG. 20 exemplarily illustrates a screenshot of a user interface associated with a user profile configured to send and/or receive messages, according to one embodiment of the present invention.

FIG. 20 exemplarily illustrates a screenshot 2000 of a user interface associated with a user profile configured to send and/or receive messages, according to one embodiment of the present invention. The user interface comprises one or more icons to view the recent activities such as, newly received messages and new users. The service provider could review and provide responses to the recent activities while the service provider using any web application or medical record system. The extension provides audio as well as visual alert to the user while receiving a new message. The extension enables the user to respond to the incoming messages as well as hold a live video visit in any application they are using at that time. The extension enables users to receive and respond to the new messages and hold the video conferencing call without leaving the application the user was working on while arriving the new messages. Further, the communication is bi-directional. The communication could be initiated by the visitor or the vendor or the service provider.

Figure 21:
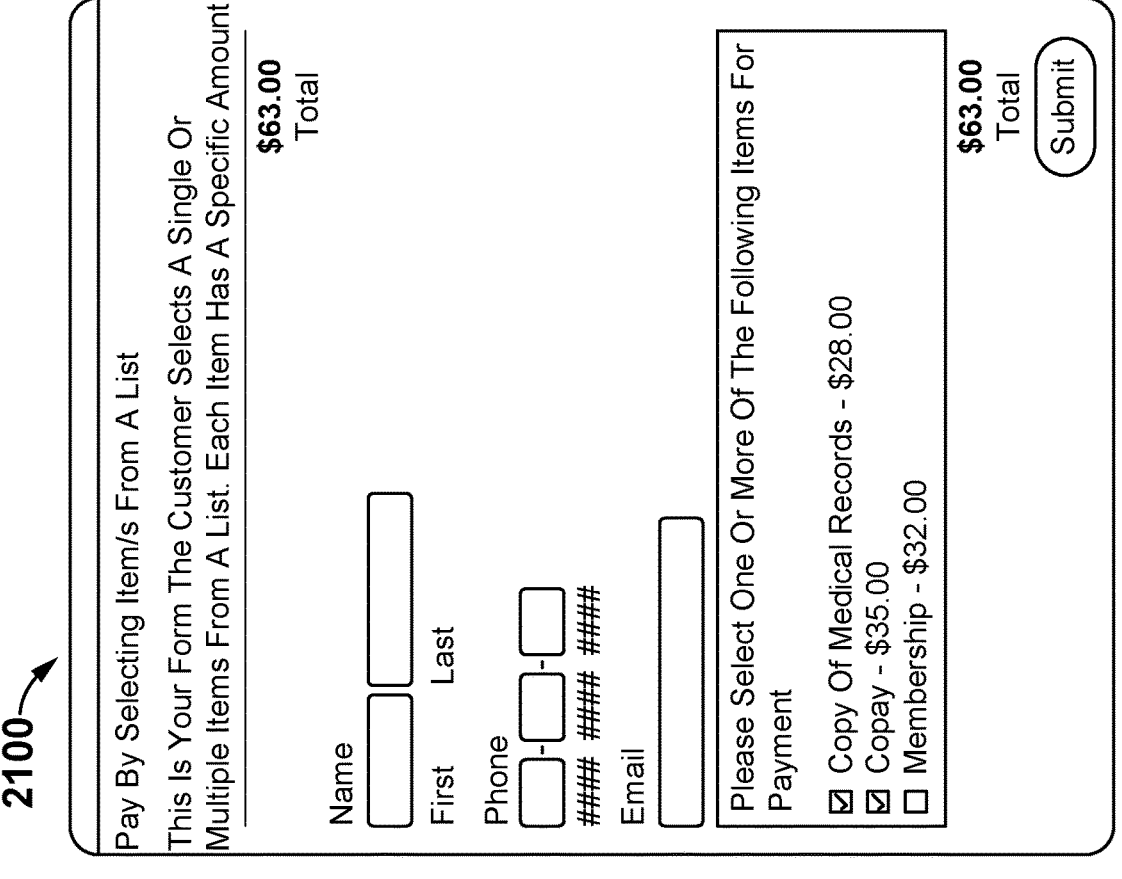
FIG. 21 exemplarily illustrates a screenshot of a user interface for payment activities associated with the user profile, according to one embodiment of the present invention.

FIG. 21 exemplarily illustrates a screenshot 2100 of a user interface for payment activities associated with the user profile, according to one embodiment of the present invention. The user interface comprises one or more icons to make payment. The user interface further comprises one or more items such as copy of medical records, copay, and membership that are selectable by a user. Each item has a specific amount. The user could select one or more items for payment. During payment, one or more user credentials such as name, mobile number, and email address are need to be entered on the user interface. Upon selecting one or more items, the total amount for selected items is calculated. On clicking 'Submit' the payment activity gets started.

Figure 22:
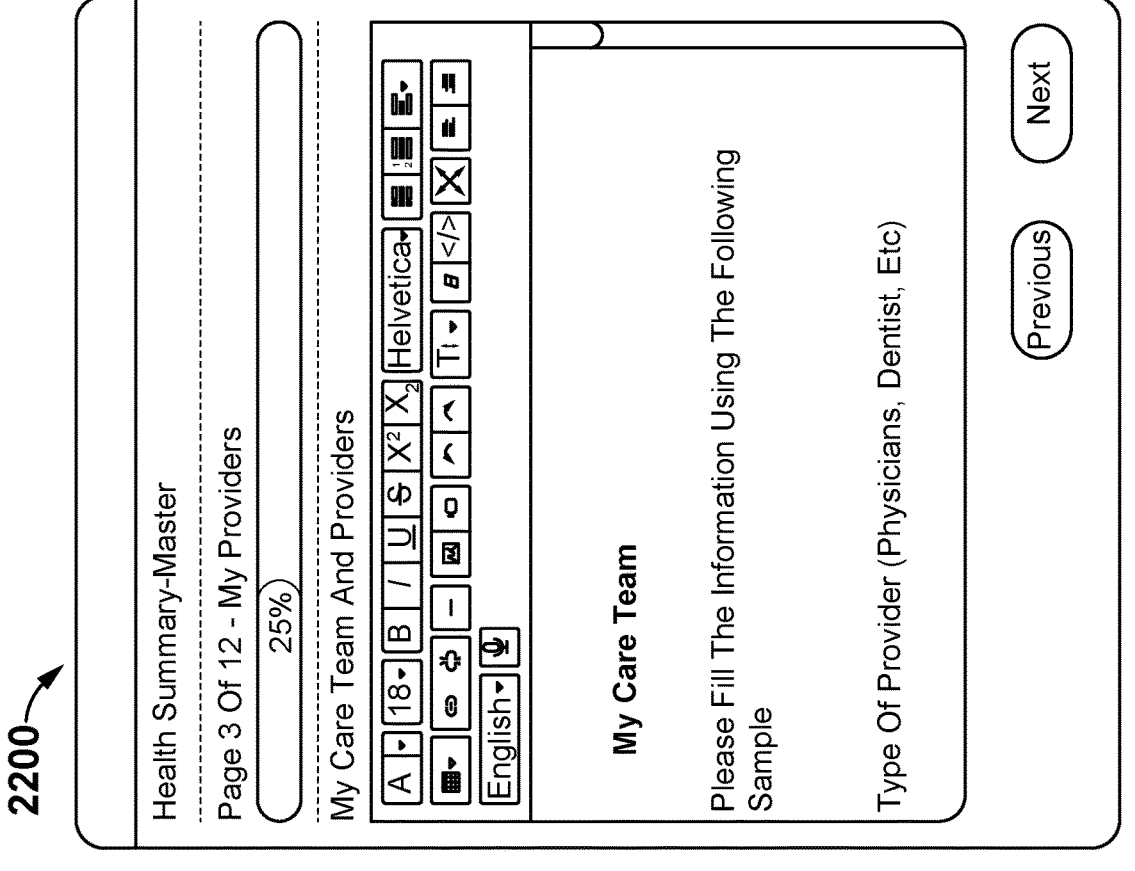
FIG. 22 exemplarily illustrates a screenshot of a user interface displaying a health summary-master associated with the user profile, according to one embodiment of the present invention.

FIG. 22 exemplarily illustrates a screenshot 2200 of a user interface displaying a health summary-master associated with the user profile, according to one embodiment of the present invention. The screenshot 2200 of the user interface is a sample document to assist the user to fill the health summary. The user could enter the details of a provider, for example, physician, dentist, etc. based on their requirement. The sample document comprises 12 pages. The user interface allows the user to review the previous and upcoming pages. Further, the sample document has dictated in about 72 languages to assist users around the world.

Figure 23:
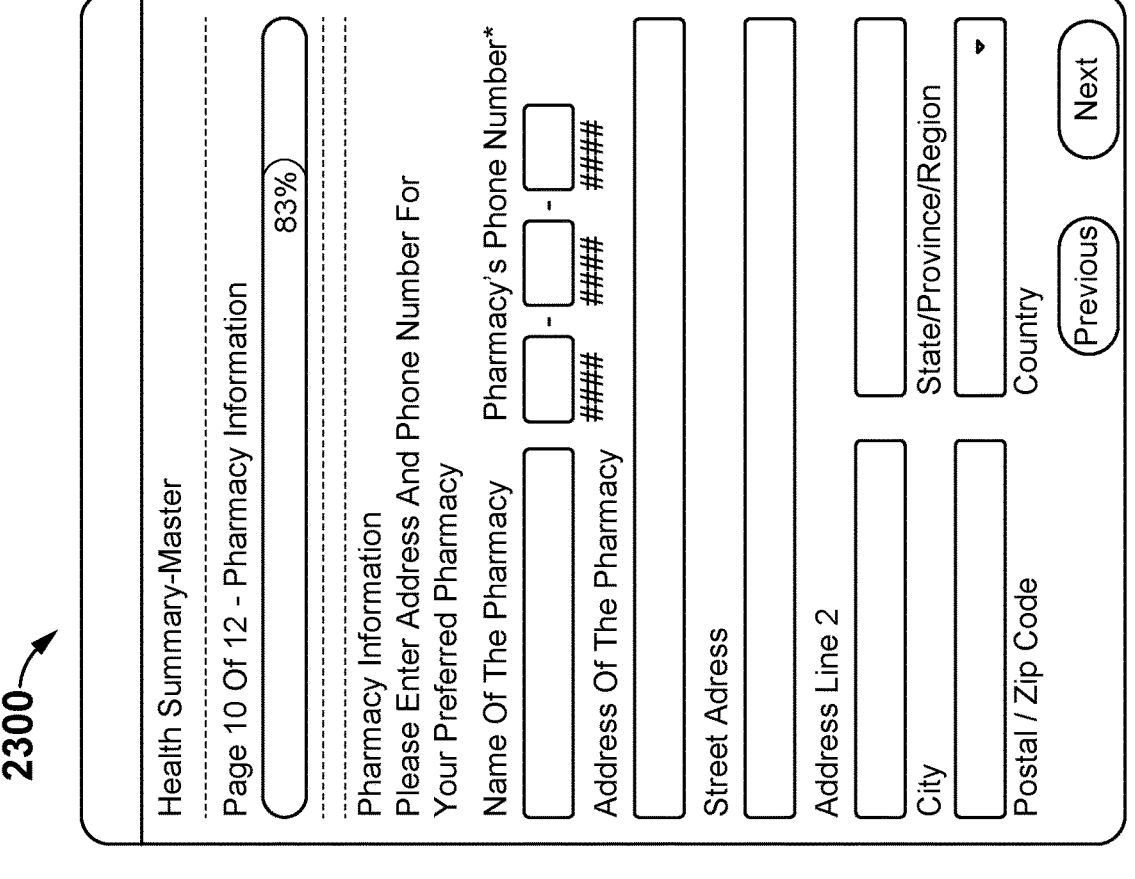
FIG. 23 exemplarily illustrates a screenshot of a user interface displaying a health summary-master associated with the user profile to collect pharmacy information, according to one embodiment of the present invention.

FIG. 23 exemplarily illustrates a screenshot 2300 of a user interface displaying the health summary-master associated with the user profile, according to one embodiment of the present invention. The health summary further comprises pharmacy information, which is provided by the user. The pharmacy information such as name of the pharmacy, pharmacy's phone number, and address are need to be entered on the health summary. Upon successful completion of health summary, the interface will collect the date and signature of the user as shown in a screenshot 2400 of FIG. 24.

FIG. 25 exemplarily illustrates a screenshot 2500 of a user interface to assist users, according to one embodiment of the present invention. The user interface comprises various topics to assist users to create a database and survey of forms. Also, it assists users to add, edit, search, and manage the records. The user interface also assists users to create reports and charts that could be securely shared with others. Further, the interface assists users to download the records as excel or transmit to remote sites.

Figure 26:
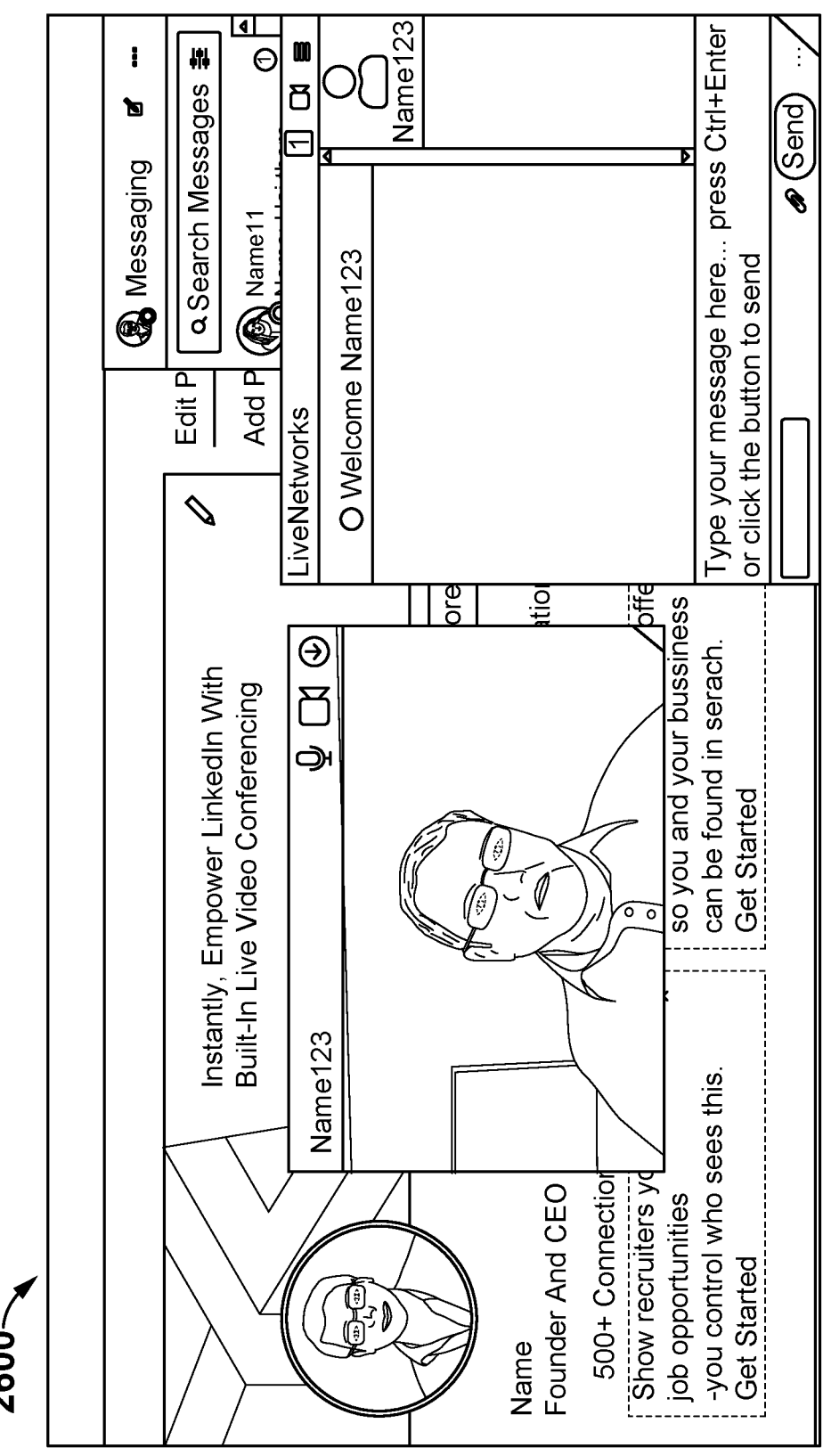
FIG. 26 exemplarily illustrates a screenshot of a user interface displayed on top of a web application, for example, LinkedIn®, according to one embodiment of the present invention.

FIG. 26 exemplarily illustrates a screenshot 2600 of a user interface displayed on top of a web application, for example, LinkedIn®, according to one embodiment of the present invention. The user interface allows the service providers and the users to chat and make video conference while using different web applications without leaving the web page. If both users agree to hold a live video meeting, they click on the video icon and the video conferencing takes place inside the LinkedIn® without leaving the current page. On clicking the video symbol on the user interface, the service provider or user could make video conference with other users. Also, the service provider or user could chat with other users by typing on a text box on the bottom of the user interface. While the user runs on the different application, for example, LinkedIn®, the user could make live chat and video conference at the same time on the same screen as it is a single application.

Figure 27:
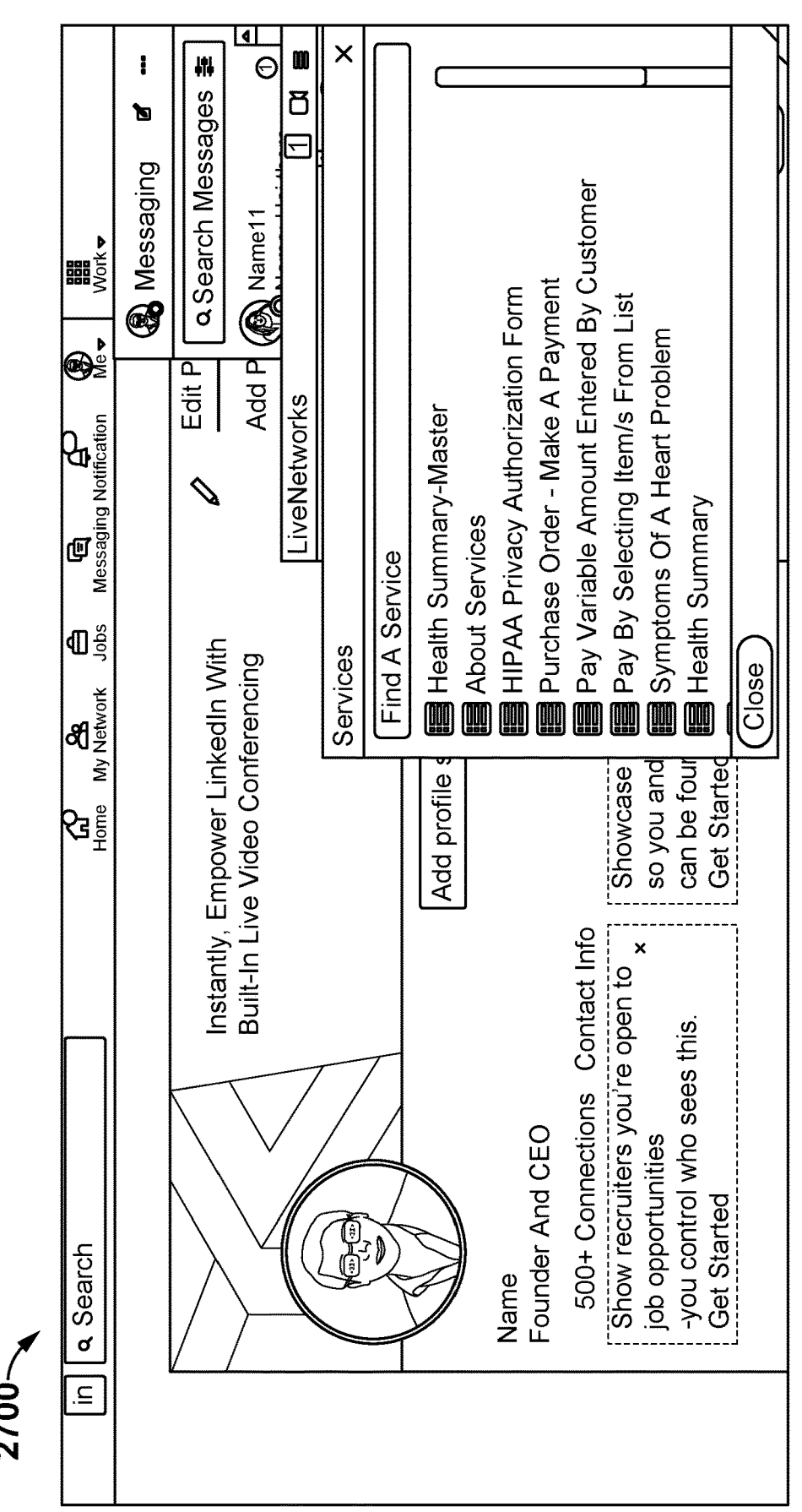
FIG. 27 exemplarily illustrates a screenshot of a user interface displaying one or more services, according to one embodiment of the present invention.

FIG. 27 exemplarily illustrates a screenshot 2700 of a user interface displaying one or more services, according to one embodiment of the present invention. The one or more services include, but not limited to, health summary-master, about services, HIPPA privacy authorization form, purchase order to make a payment, pay variable amount entered by user, pay by selecting items from a list, symptoms of a heart problem, health summary. The user interface allows the user to select any one of the above listed services.

Figure 28:
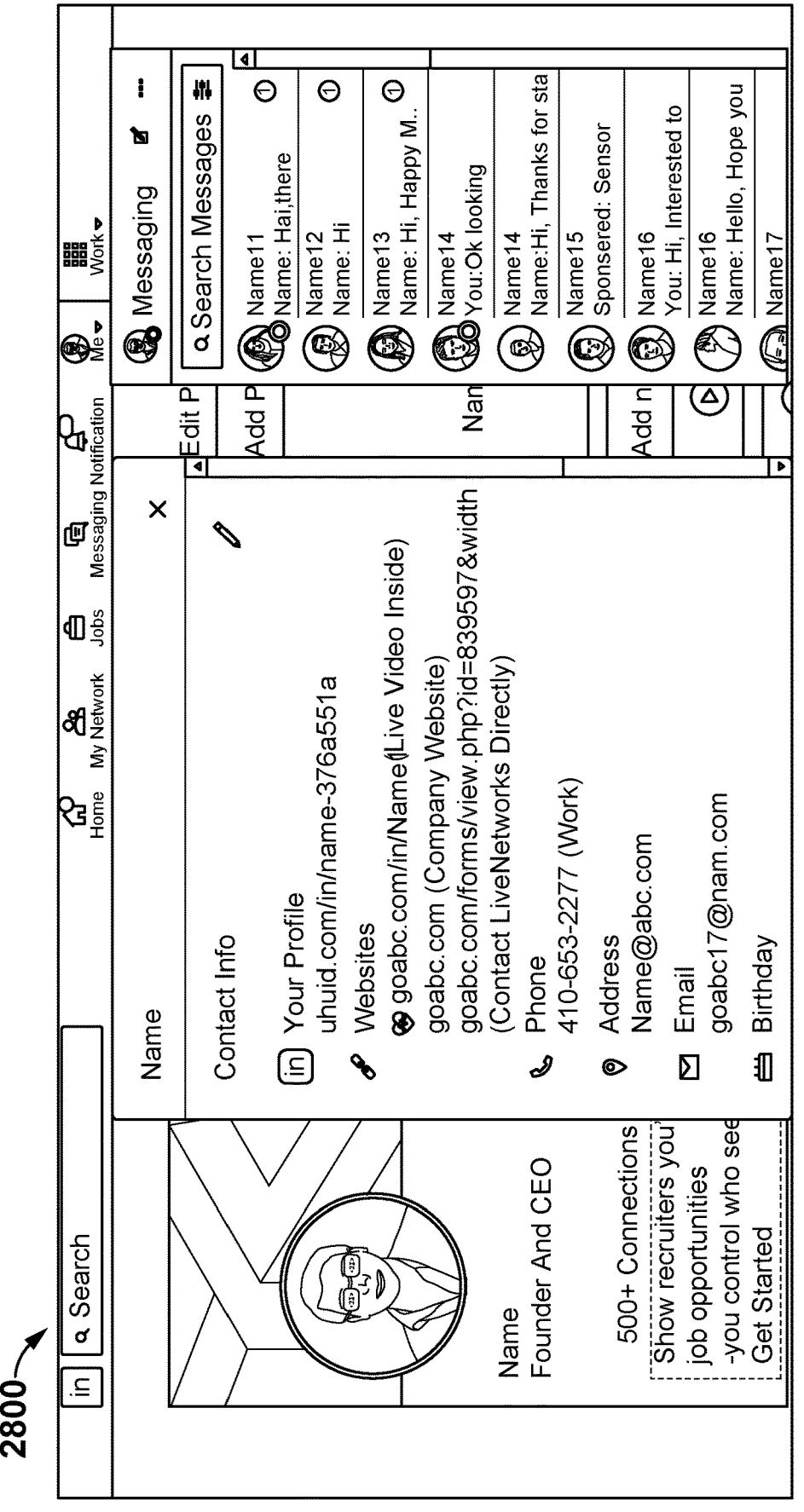
FIG. 28 exemplarily illustrates a screenshot of a user interface displaying on a web application installed with a browser extension, according to one embodiment of the present invention.
Figure 29:
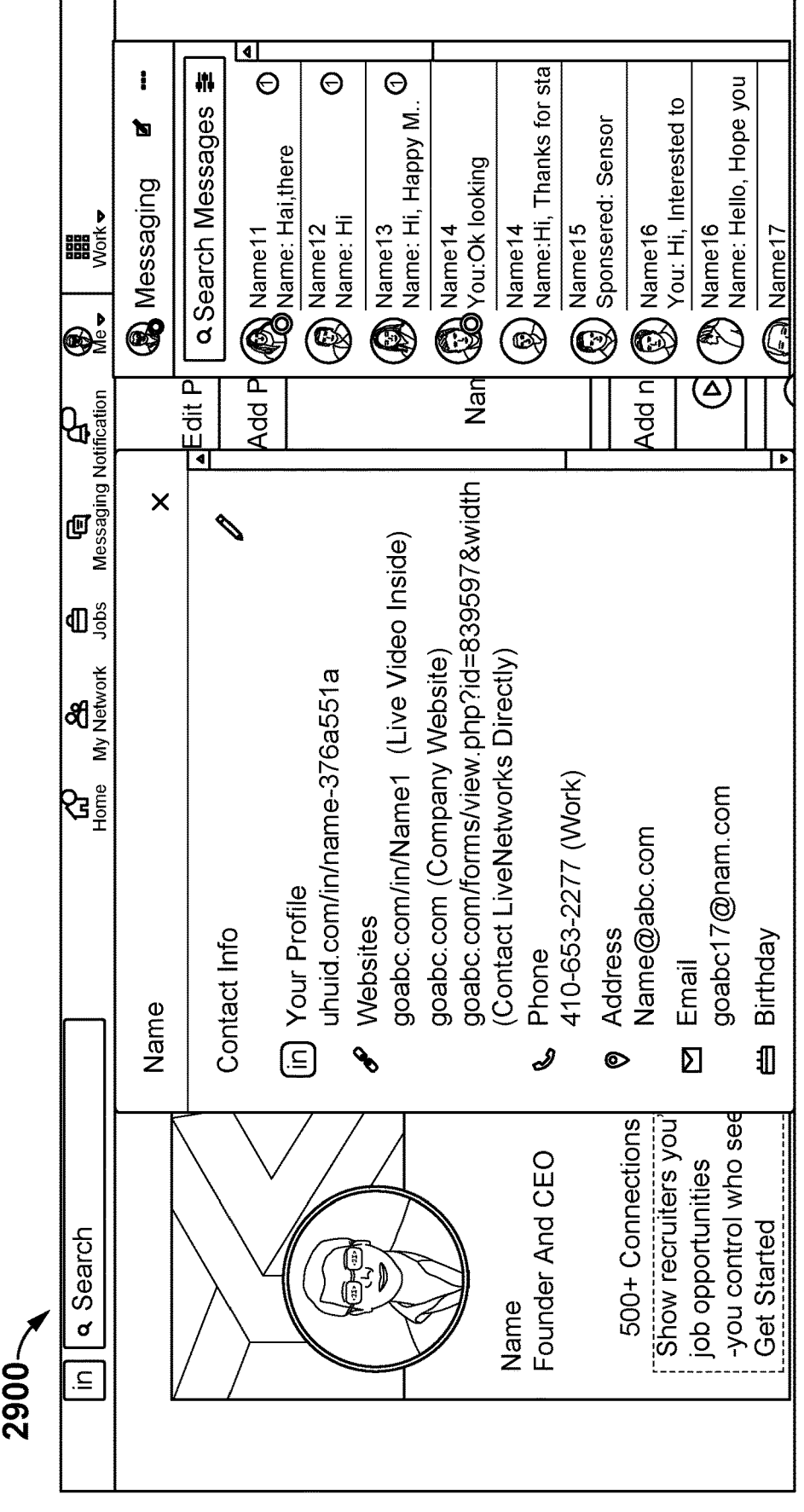
FIG. 29 exemplarily illustrates a screenshot of a user interface displaying on a web application without a browser extension, according to one embodiment of the present invention.

FIGS. 28 and 29 exemplarily illustrate a screenshot 2800 and a screenshot 2700 of a user interface displaying on a web application respectively, according to one embodiment of the present invention. The screenshot 2900 shows the user interface of the web application without installing the extension. Upon installing the extension, it allows the user to register using a username and a password to become a subscribed or potential member. The extension then assigns a special portal ID or a special link to each potential member. The user could place that assigned link in portal ID in their LinkedIn® profile. When a visitor or the potential user visits the profile the browser extension identifies that link inside the LinkedIn® and colors it in purple and adds a logo to it for visual identification.

Figure 30:
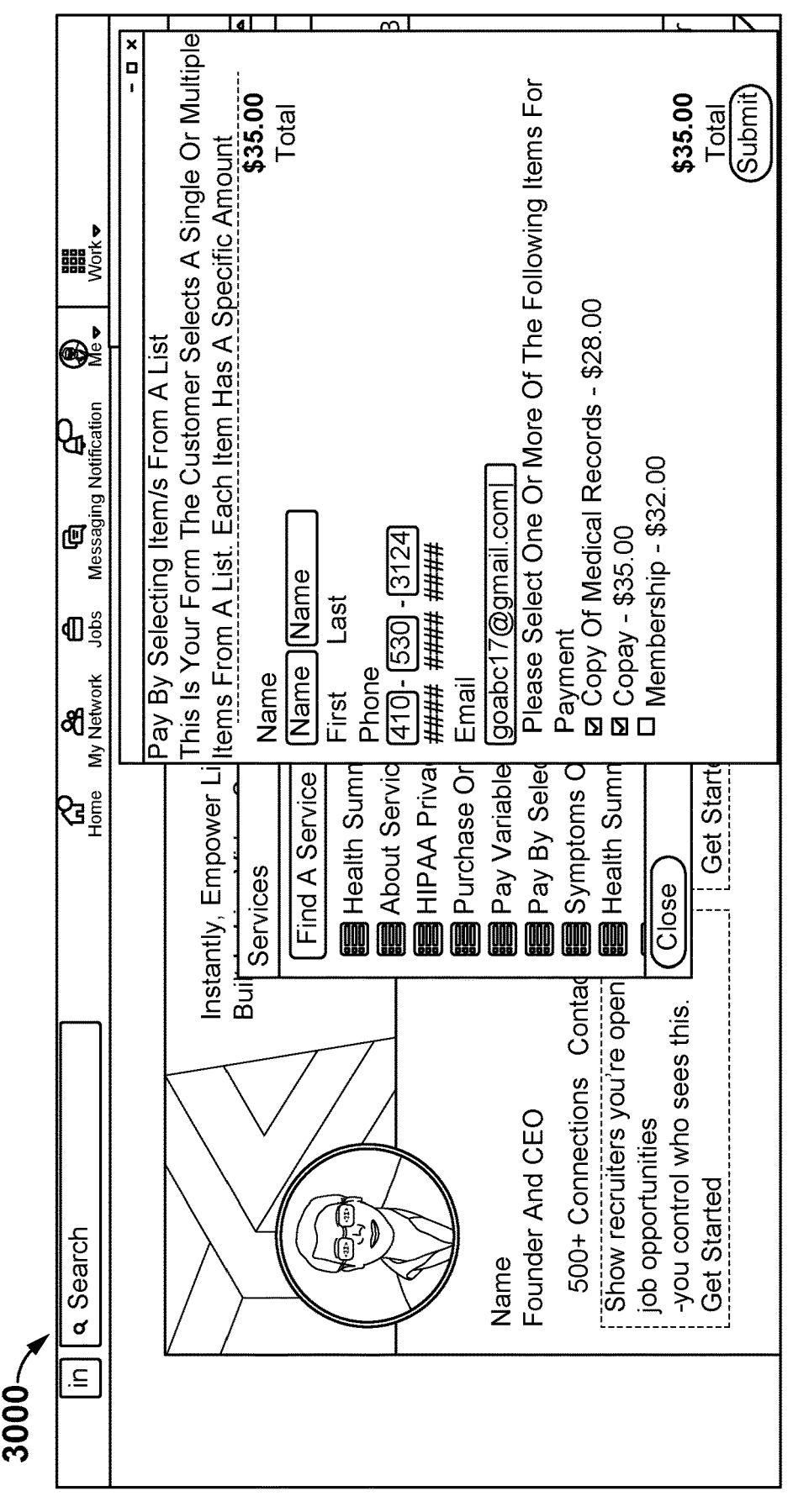
FIG. 30 exemplarily illustrates a screenshot of a user interface displayed on a web application associated with the user profile, according to one embodiment of the present invention.

FIG. 30 exemplarily illustrates a screenshot 3000 of a user interface displayed on a web application associated with the user profile, according to one embodiment of the present invention. The user interface of the extension allows the user to select the service and one or more items to make payment for the selected service to the service provider while running on the different web application.

Figure 31:
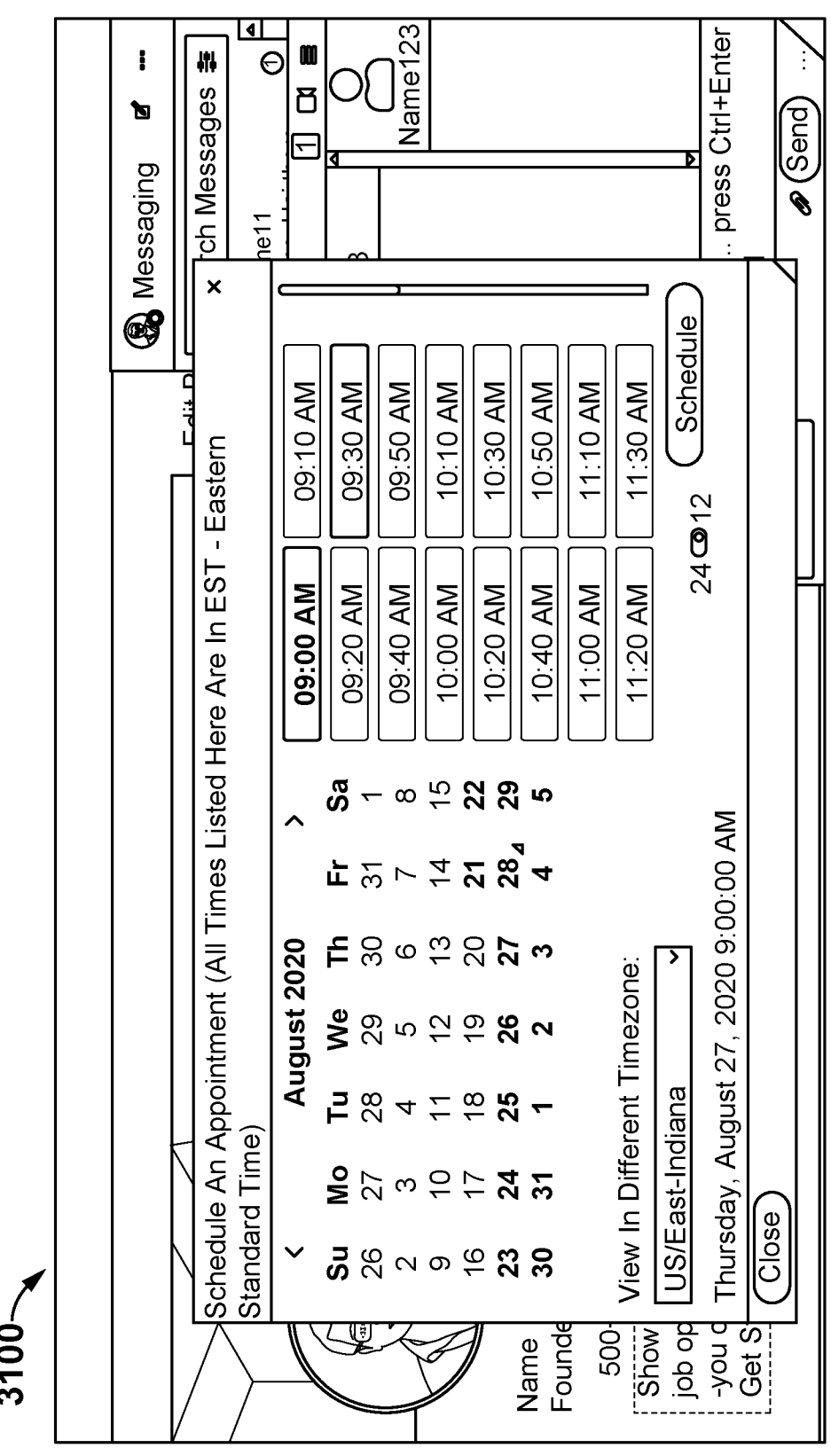
FIG. 31 exemplarily illustrates a screenshot of a user interface to schedule an appointment while running on a different web application, according to one embodiment of the present invention.

FIG. 31 exemplarily illustrates a screenshot 3100 of a user interface to schedule an appointment while running on a different web application, according to one embodiment of the present invention. The user interface has different time zone to assist user in different places around the world. The user interface of the extension allows the service provider to schedule the service, online or offline meeting with date and time.

Figure 32:
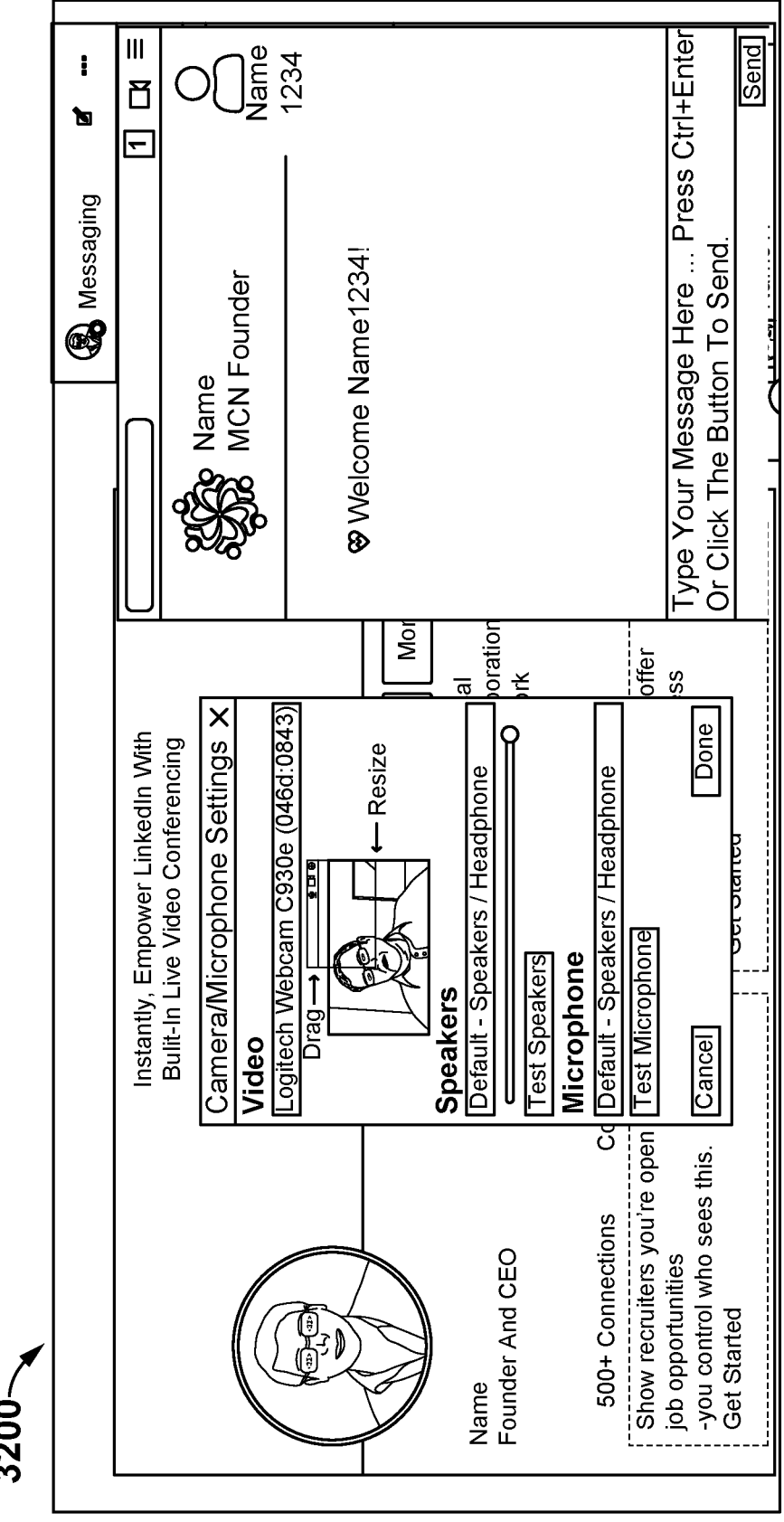
FIG. 32, exemplarily illustrates a screenshot of the user interface displayed camera and microphone settings while logging in and using a social network, for example, LinkedIn®, according to one embodiment of the present invention.

FIG. 32, exemplarily illustrates a screenshot 3200 of the user interface displayed camera and microphone settings while logging in and using a social network, for example, LinkedIn® in one embodiment of the present invention. In one embodiment, the user could login into the system for checking inbox, charting, and participate in a video conference without any interferences and disturbances while logging in and using other social network, for example, LinkedIn®. In one embodiment, the user could change settings of the camera and microphone before starting a video conference or a video chatting while logging in and using another social network, for example, LinkedIn®. In one embodiment, the user could install an extension, for example, from a web store so that the user could directly logging in into the system by providing credentials such as user name and password while logging in and using any other social networks, for example, LinkedIn®. The user could login into the system by providing full name and e-mail by clicking on the added hyperlink.

Figure 33:
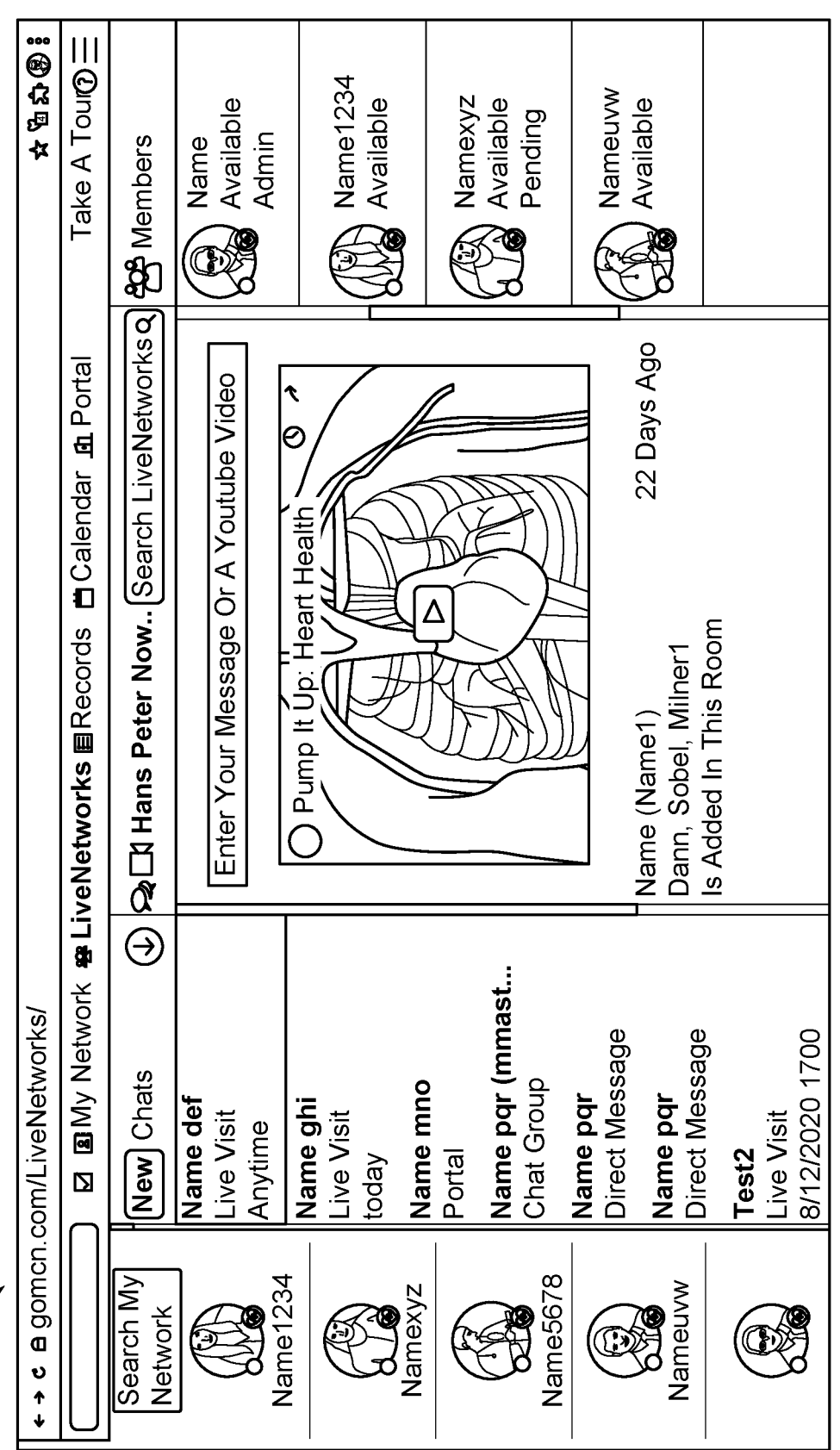
FIG. 33, exemplarily illustrates a screenshot of the user interface displayed a messaging system associated with the user profile, according to one embodiment of the present invention.

FIG. 33, exemplarily illustrates a screenshot 3300 of the user interface displayed a messaging system associated with the user profile according to an embodiment of the present invention. In one embodiment, the system could enable the admin or member to select LiveNetworks by clicking on a LiveNetworks icon displayed on the top of the user interface and also enable to add one or more persons from the entries or contacts in the chat group. The admin or member could share messages or videos, for example, from YouTube by entering on the enter bar displayed on the user interface. In one embodiment, a LiveNetworks search bar in displayed on the top of the user interface for enabling the admin or member to search videos.

Figure 34:
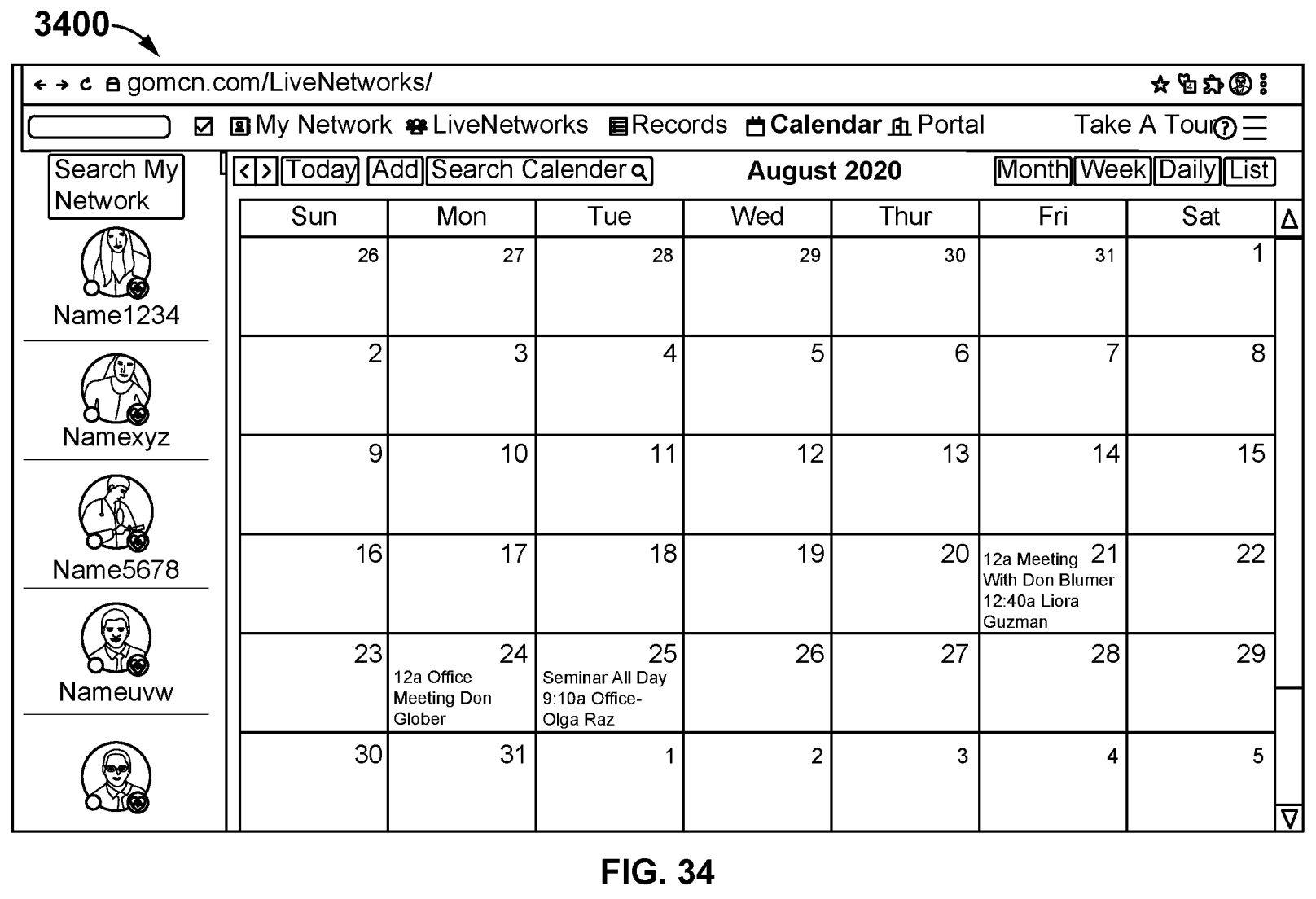

FIG. 34, exemplarily illustrates a screenshot 3400 of the user interface displayed a calendar associated with the user profile according to an embodiment of the present invention. In one embodiment, the system could enable the user to simply enter meeting data and information about the meeting's participants, seminars, and topics, and etc. by clicking on a calendar icon. In one embodiment, the system could enable the user or member to manage the calendar entries by displaying scheduled information entered into the calendar and/or calendar platform, thereby enabling the user to conveniently access and manage all of the user's calendar entry data within a single displayed result.

Figure 35:
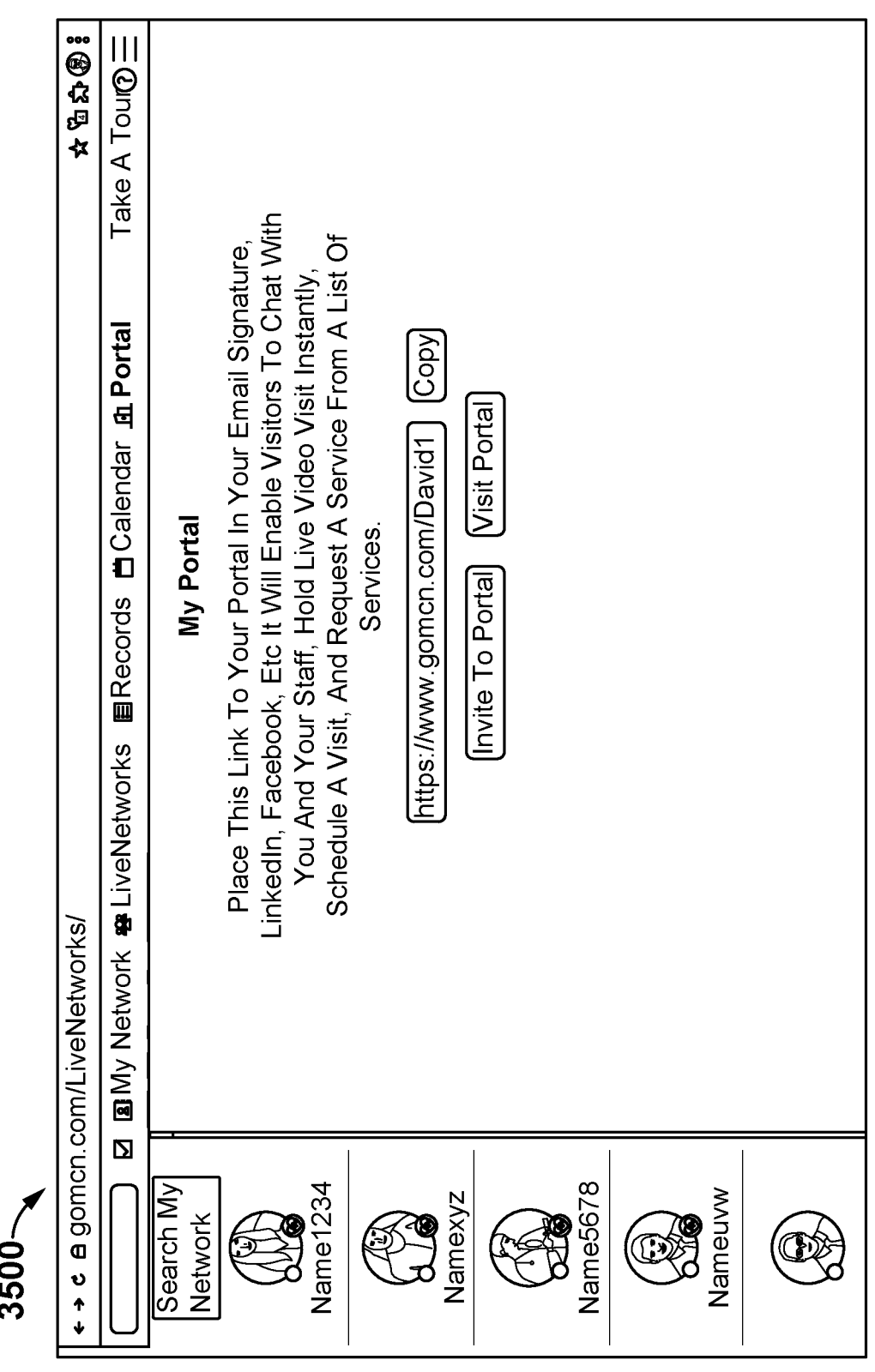
FIG. 35, exemplarily illustrates a screenshot of the user interface displayed a portal associated with the user profile, according to one embodiment of the present invention.

FIG. 35, exemplarily illustrates a screenshot 3500 of the user interface displayed a portal associated with the user profile according to an embodiment of the present invention. In one embodiment, the system could enable the user to manage and check the portal by clicking on the portal icon displayed on the top of the user interface. In one embodiment, the portal displays a hyperlink that could be used to keep other websites and social network accounts such as, but not limited to, e-mail signature, LinkedIn®, Facebook®, etc. The hyperlink enables visitors to chat with the user and staff, instantly hold live video visit, schedule a visit, and request a service from a list of services. In one embodiment, the system could enable to visit the portal and also invite to portal by clicking on the respective icons displayed on the user interface.

Figure 36:
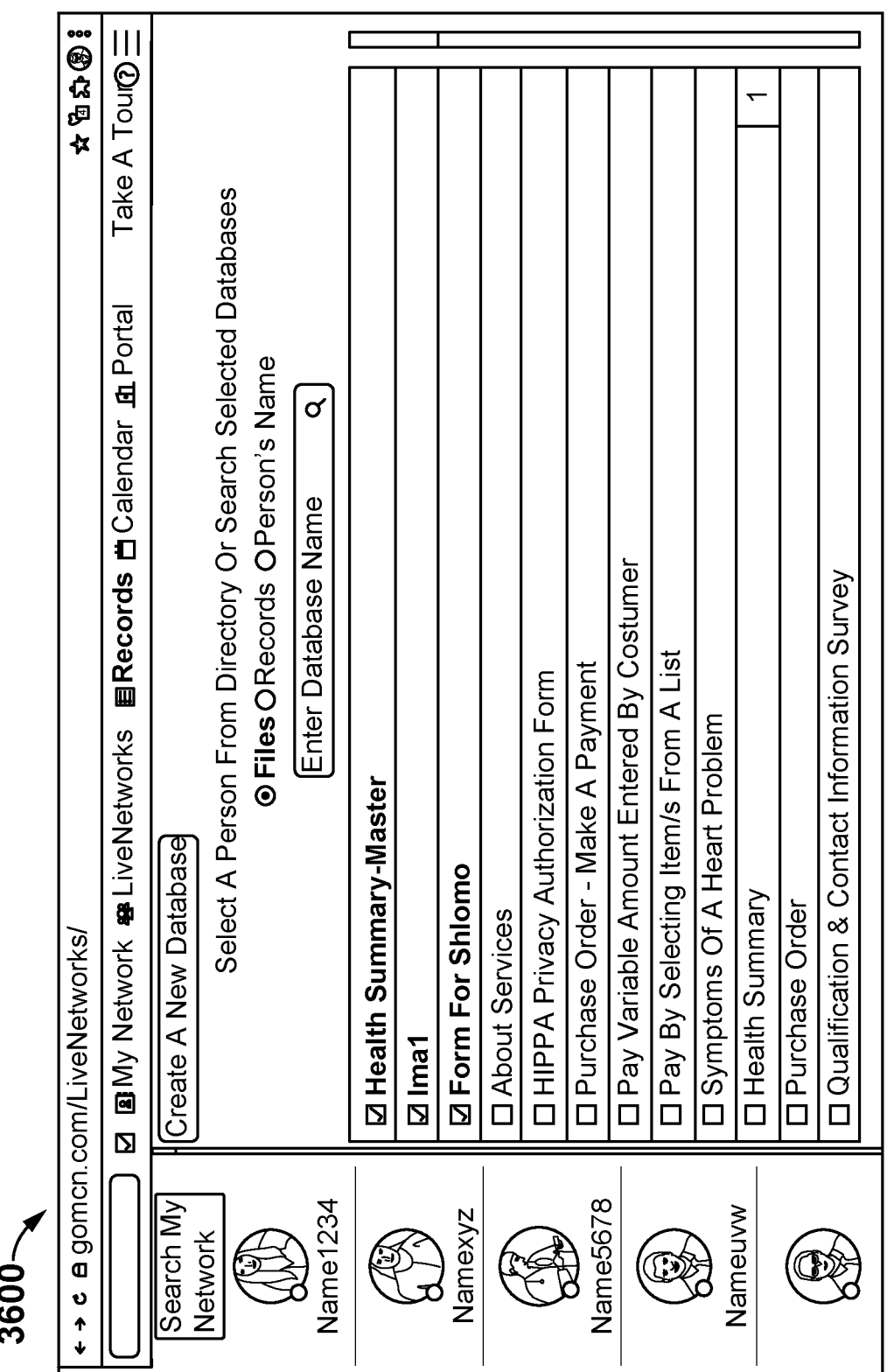
FIG. 36, exemplarily illustrates a screenshot of the user interface displayed records/files of a person from directory associated with the user profile, according to one embodiment of the present invention.

FIG. 36, exemplarily illustrates a screenshot 3600 of the user interface displayed records/files of a person from directory associated with the user profile according to an embodiment of the present invention. In one embodiment, the system could enable to search records or files by clicking on a records icon displayed on the top of the user interface and selecting a person from the directory or searching selected databases. In one embedment, a search bar is displayed on the user interface for enabling to enter database name. In one embodiment, the system could enable to create a new database and select the appeared files.

Figure 37:
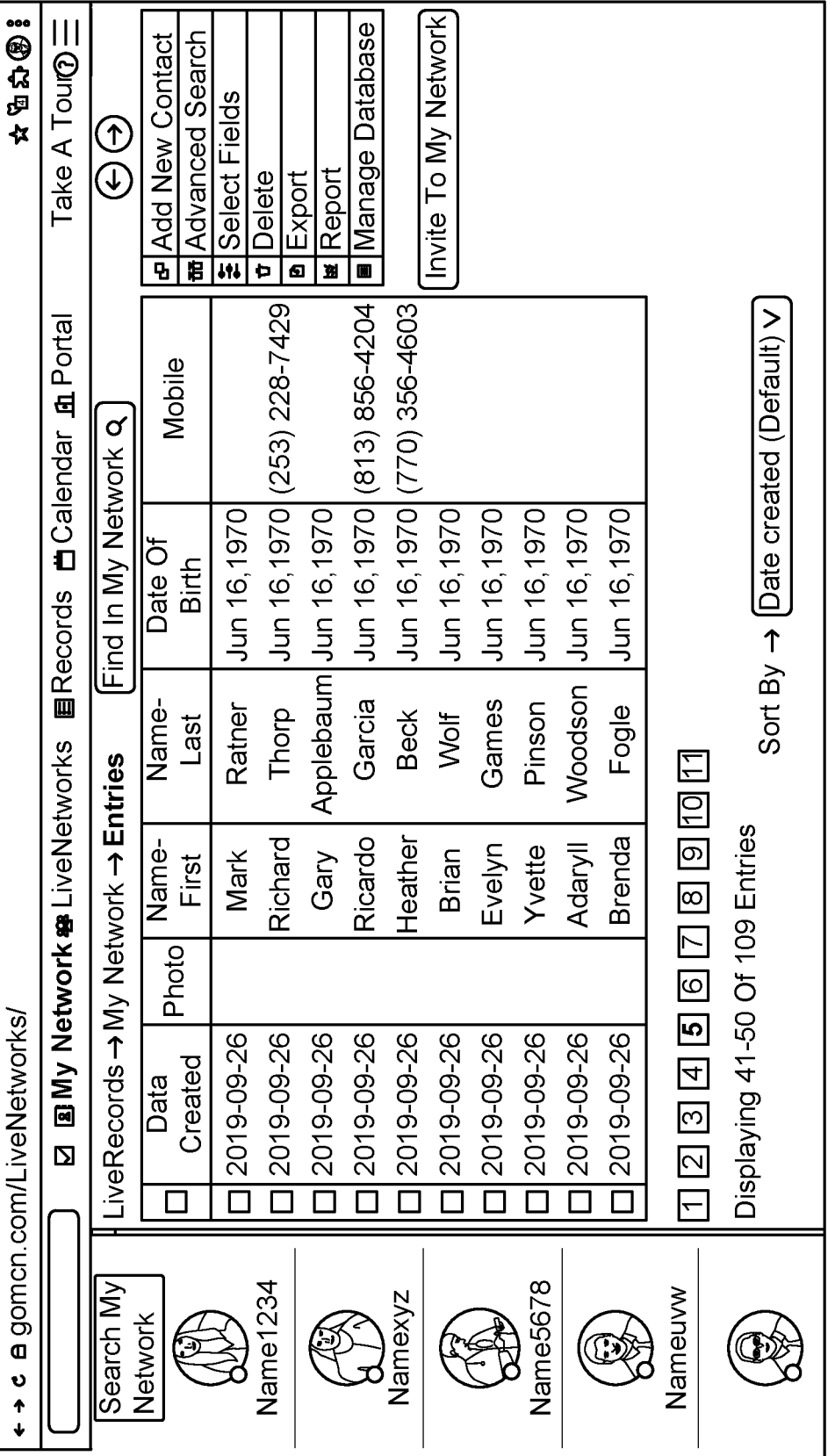
FIG. 37, exemplarily illustrates a screenshot of the user interface displayed entries from Live Records of my network associated with the user profile, according to one embodiment of the present invention.

FIG. 37, exemplarily illustrates a screenshot 3700 of the user interface displayed entries from LiveRecords of my network associated with the user profile according to an embodiment of the present invention. In one embodiment, the system could enable to check the entries from LiveRecords of my network. In one embodiment, the entries could be displayed with respective to created date, photo, first name and last name, date of birth, and mobile number. In one embodiment, a search bar is displayed on the top of the user interface for enabling to search by the first name and last name and also enable to add new contact, advanced search, select fields, delete, export, report, and manage database by clicking on the respective icons displayed on the right side of the user interface. In one embodiment, the system could enable to sort the entries list, for example, based on created date, by clicking on a sort by icon.

Figure 38:
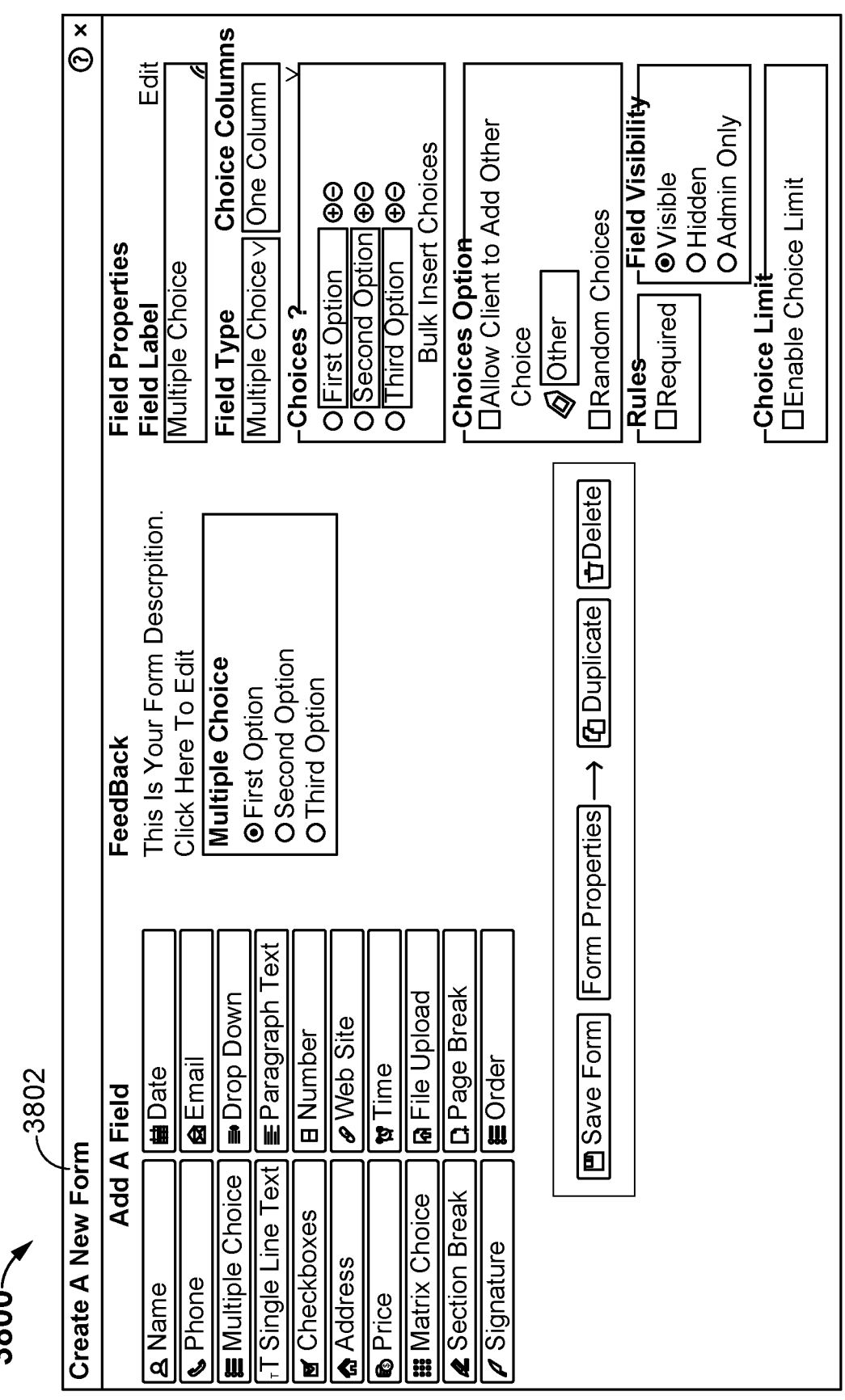
FIG. 38, exemplarily illustrates a screenshot of the user interface displayed an example form, according to one embodiment of the present invention.

FIG. 38, exemplarily illustrates a screenshot 3800 of the user interface displayed an example form 3802 according to an embodiment of the present invention. In one embodiment, the system could enable the user or member to create a form 3802 by adding multiple fields and form description. In one embodiment, the form 3802 includes a number of fields, multiple choices, and field properties with multiple checkboxes. In one embodiment, the user could select the multiple fields include, but not limited to, name, date, phone, e-mail, multiple choice, drop down, single line text, paragraph text, checkboxes, number, address, website, price, time, matrix choice, file upload, section break, page break, signature, and order. In one embodiment, the system could enable the user to provide description by clicking on a feedback icon and also enable the user to select multiple choice include, but not limited to, a first option, a second option, and a third option.

In one embodiment, the system could enable the user to edit the field properties include, but not limited to, a field label, a field type, choice columns, multiple choices, choices options for allowing client to add other choice and randomize choices, rules if required, field visibility indicate visible, hidden, admin only, and choice limit for enabling choice limit.

In one embodiment, the system could enable the user or member to save the created form by clicking on a save form icon displayed on the user interface and also check form properties by clicking on a form properties icon. In one embodiment, the system could enable the user or member to duplicate the created form by clicking on a duplicate icon displayed on the user interface and also delete the created form by clicking on a delete icon displayed on the user interface.

Figure 39:
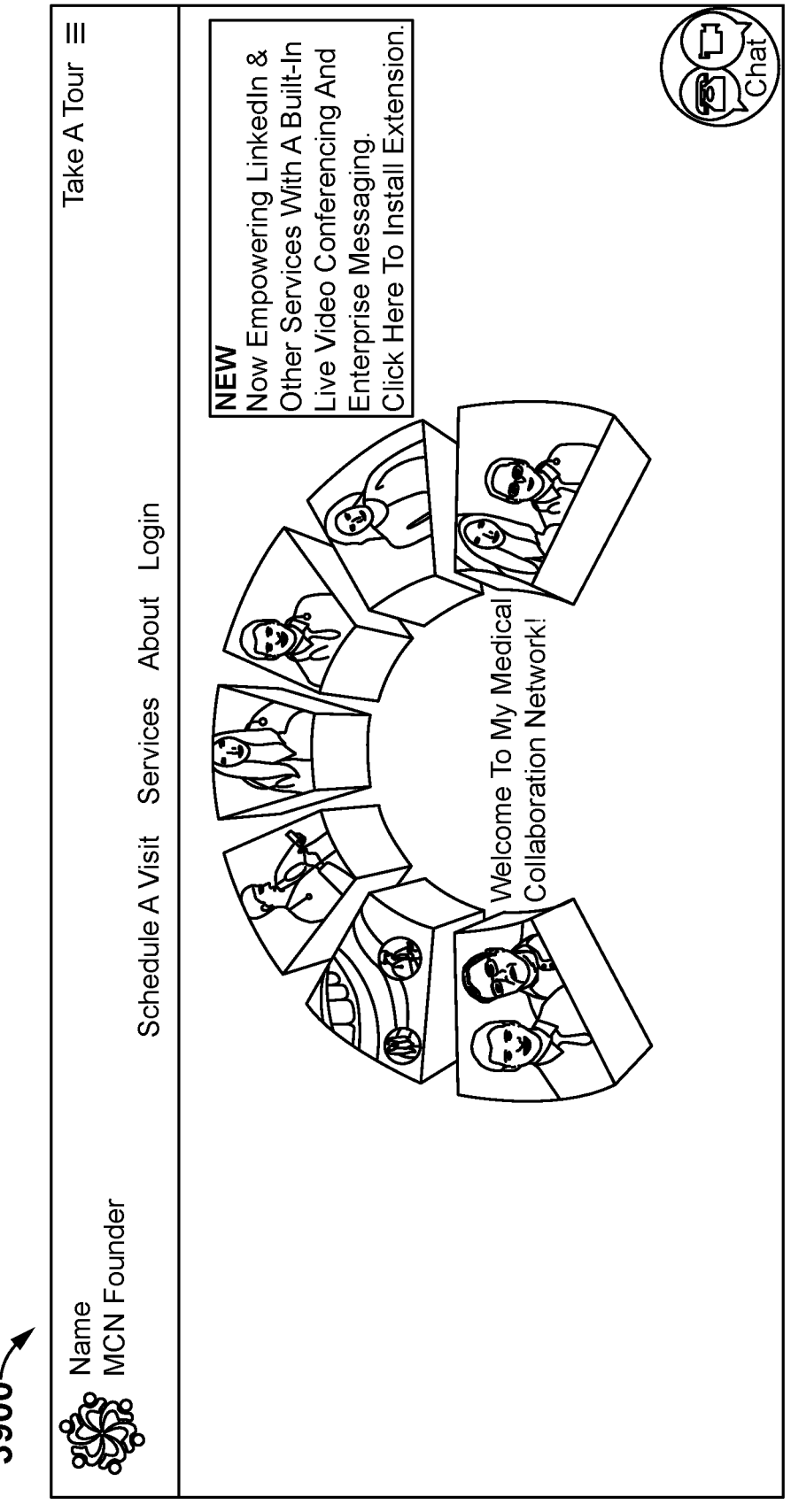
FIG. 39, exemplarily illustrates a screenshot of the user interface displayed a homepage of the system associated with the user profile, according to one embodiment of the present invention.

FIG. 39, exemplarily illustrates a screenshot 3900 of the user interface displayed a homepage of the system associated with the user profile according to an embodiment of the present invention. In one embodiment, the homepage of the system could enable the user to schedule a visit, know about the system and services by clicking on the respective icons displayed at top of the user interface. In one embodiment, the user could also login into the system by clicking on the respective icon and providing credentials, for example, a user name and a password. In one embodiment, the user could also download and install an extension of the system by clicking on the respective icon displayed on top of the user interface. In one embodiment, the user could directly perform chat and participate in a video conference by clinking on the respective icon.

Figure 40:
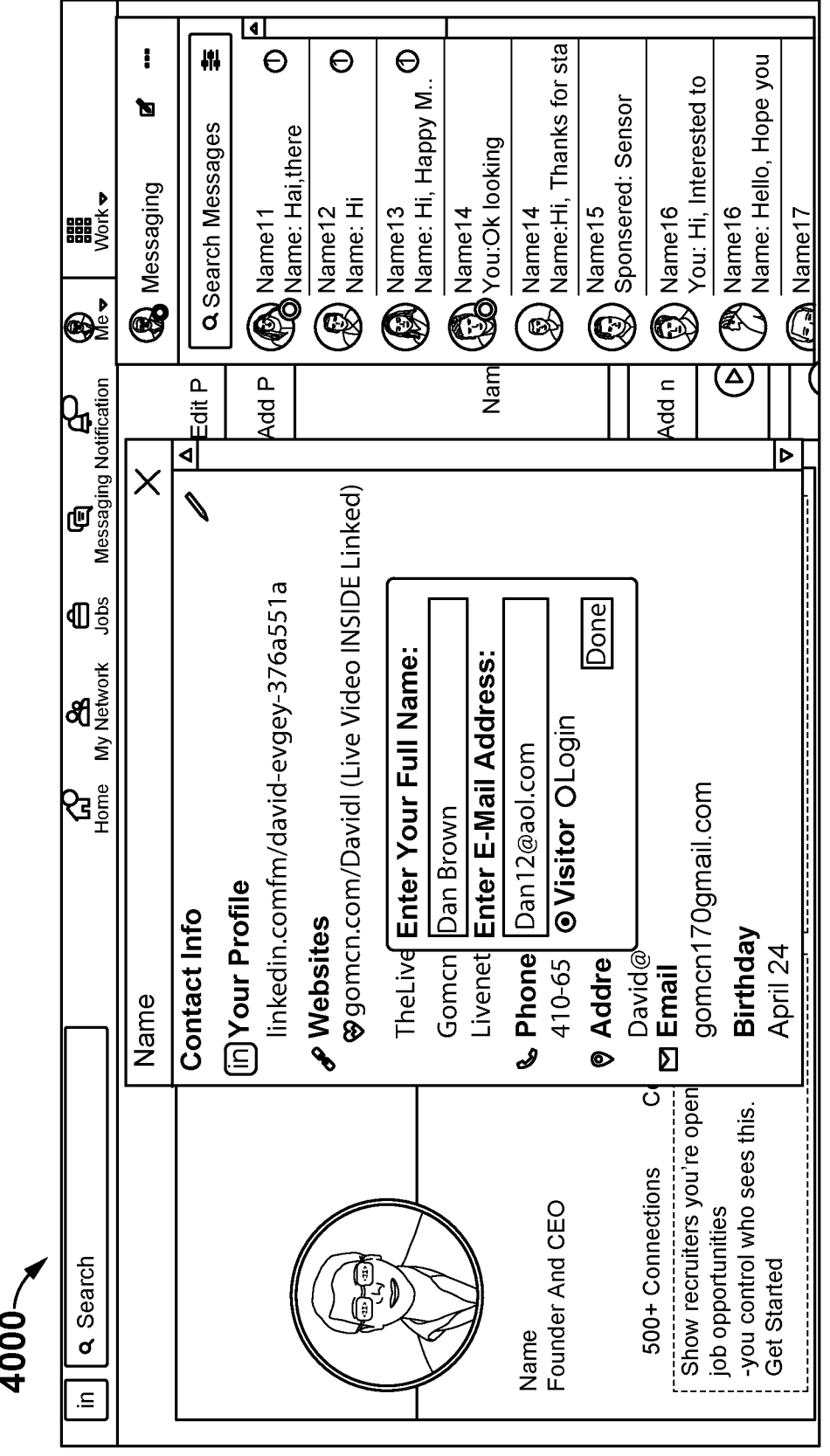
FIG. 40, exemplarily illustrates a screenshot of the user interface displayed a contact info section of the user associated with the user profile, according to one embodiment of the present invention.

FIG. 40 exemplarily illustrates a screenshot 4000 of the user interface displayed a contact info section of the user associated with the user profile according to an embodiment of the present invention. In one embodiment, the user could add a hyperlink in any websites or social networks, for example, LinkedIn®, Facebook®, Instagram®, Twitter®, and etc. in order to login into the system for checking inbox, charting, and participate in a video conference without any interferences and disturbances while logging in and using the social network, for example, LinkedIn®. In one embodiment, the user could install an extension, for example, from a web store so that the user could directly logging in into the system while logging in and using the social network. The user could login into the system by providing full name and e-mail by clicking on the added hyperlink. In some embodiments, the user could also login into the system as a visitor.

Figure 41:
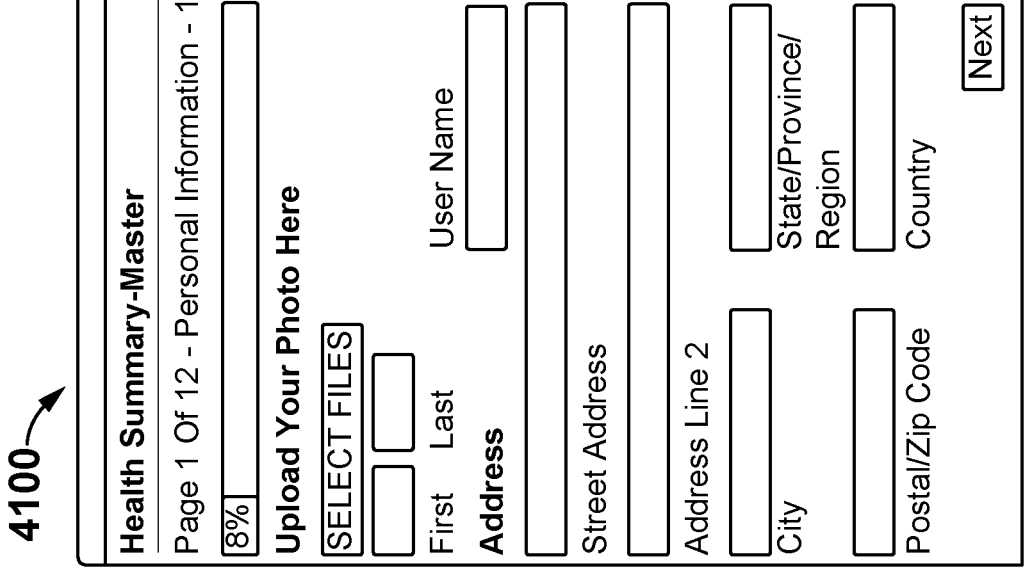
FIG. 41 exemplarily illustrates a screenshot of the user interface displayed a health summary master, according to one embodiment of the present invention.

FIG. 41 exemplarily illustrates a screenshot 4100 of the user interface displayed a health summary master according to an embodiment of the present invention. In one embodiment, the user or member could provide details such as, but not limited to, upload photos, first name, last name, address, city, state/province/region, postal/zip code, and country, and etc. The user could go to next page for providing other details once successfully fills the all details in the first page. The user interface could display or indicate the completion percentage of the personal information provided by the user at the top of the user interface.

Figure 42:
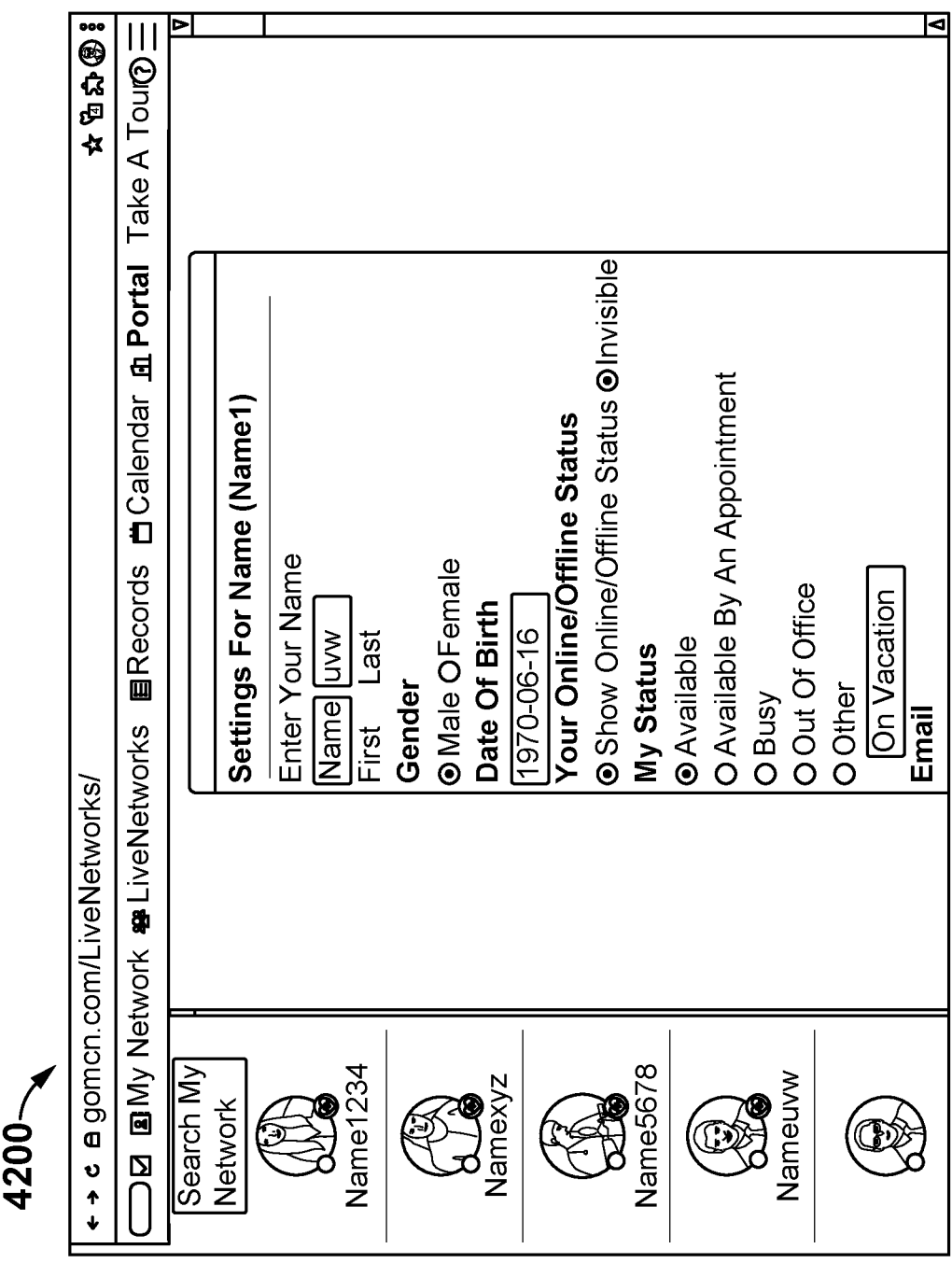
FIG. 42 exemplarily illustrates a screenshot of the user interface displayed setting selections associated with the user or member profile, according to one embodiment of the present invention.

FIG. 42 exemplarily illustrates a screenshot 4200 of the user interface displayed setting selections associated with the user or member profile, according to an embodiment of the present invention. In one embodiment, the system, in various exemplary embodiments, may be configured for allowing the user or member to select various settings include, but not limited to, first name, last name, gender, date of birth, online/offline status, status, and e-mail, and etc. In one embodiment, the user could freely select a plurality of user setting menu options according to their requirement. The user or member could save the changes in the setting when successfully completes the selection of setting options. In one embodiment, the user could select the online/offline status and status. Thus, a user who is online can continually view the online status, for example, online/offline or invisible, of his associated members. In one embodiment, the status may indicate available, available by an appointment, busy, out of office, and other, for example, on a vacation, etc.

The invention provides a specific link for opening a chat with photo, name and logo of the service provider to verify and acknowledge the identity of the service provider. Users of the chat could post images and PDF files as well as built-in forms. All process happens while running on top of any web application/medical record system such as Epic or Cerner, as well as social networks such as LinkedIn® and Facebook® and for the visitor, it would like it is part and parcel of the application. The system empowers any web application or service with services of live video conferencing without any code modification. At the request of the service provider launching a live video conferencing. The visitor does not have to click on the designated link to start the video conferencing. Video conferencing takes place on top of the application. The system empowers any web application or web service with services of collection of secure HIPAA compliant data, signatures and payments, without any code modifications. During the chat, the service provider may post forms, single page or multiple pages, including a collection of administrative or clinical data, signatures and payments, within the chat. The whole service runs and operates on top of other applications and services and without any code modification.

Advantageously, the invention is useful for applications and workflow that lack either video conferencing and/or enterprise messaging and need these services, particularly in the new normal environment. The invention provides easy way to respond to messages while working on any other application at the same time without leaving the page. Further, the invention is ideal for marketing and advertising in social networks as "shortest distance to new customers" to know the more relevant item to an ad by answering the questions.

Although client-side functionality is described above as being included in a plug-in of a web browser application, one skilled in the art would understand that the client-side functionality described above may also be implemented as a stand-alone application executing on a client device or visitor device or service provider of a user or as a plug-in or extension or browser extension of other types of applications in addition to web-browser applications.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A system comprising:
   a server;
   a processor; and a memory storing instructions executable by the processor, the instructions comprising a software module implemented as at least one of a browser extension or plugin component,
   wherein the browser extension or plugin component communicates directly with LiveNetworks server and further comprises:
   an instant communication module configured to:

integrate and display user interfaces of one or more Enterprise Messaging Network services over a web application executed in a browser environment on a device of a staff member of a hospital, a clinic, or a business, and on a visitor device;

enable real-time communication, including video conferencing and messaging, between the staff member and one or more visitors via said Enterprise Messaging Network services, and a cross-domain configuration framework, implemented on the server, enabling secure, permissioned interaction of the software module with external websites, third-party applications, and social media platforms while maintaining compliance with healthcare data privacy requirements;

wherein the system adds images and text links on top of an application running in a browser, and/or it detects images and text links in the application and visually marking the images and text links related to LiveNetworks services;

upon user clicking on the images and text links, the system activates HIPAA-compliant, enterprise-grade content messaging and chat, forms, scheduling and live video conferencing features while the application runs in the background;

detect and access structured and unstructured content of the application running in the background;

capture user-selected data from the web application, including text, images, electronic medical records (EMRs), and other content displayed by third-party applications or services, record and organize the captured data into a structured format in the form of a report;

share the captured data or the report, in structured format, with individuals or groups through an integrated secure, HIPAA-compliant enterprise messaging service, all while running within a third-party application;

enable recipient(s) of the captured data or shared report to search, filter, move columns of data in the captured data or shared report, and dynamically create charts, such as bar charts, pie charts, and tables, from the selected data in the captured data or shared report;

a link generation module configured to:

generate a unique uniform resource locator (URL) identifying a registered staff member or registered user;

enable the registered user, upon clicking the unique URL, to launch the browser extension or plugin, and instantly initiate a live video conferencing and messaging session with the identified registered staff member or registered user within the browser environment;

a registration module configured to:

enable creation of staff and user accounts by registering one or more credentials;

store user preferences, session logs, and access privileges on the server wherein the system is configured to operate within existing electronic medical record (EMR) systems, social media platforms, and browser-based applications, thereby facilitating secure, real-time communication and data transfer among healthcare personnel, patients, and external collaborators.

2. The system of claim 1, wherein the instant communication module further configured to display an interface of the one or more Enterprise Messaging Network services over a mobile application being executed on the staff members of a hospital, a clinic, or a business device as a package of the mobile application.

3. The system of claim 1, wherein the one or more Enterprise Messaging Network services includes a live video conferencing service, an instant messaging service and notifications service, a group messaging service and a direct file sharing service.

4. The system of claim 3, wherein the one or more Enterprise Messaging Network services includes, visually identifying links related to enterprise messaging in one or more social media networks or online applications and electronic medical records and service, and initiate an instant live video conferencing and messaging with one or more persons from predefined contact list stored on a server, while working on one or more social media networks or online applications and electronic medical records.

5. The system of claim 1, wherein the instant communication module is bi-directional and configured to enable an Enterprise Messaging Network to communicate with online visitors while working on one or more social media networks or online applications and electronic medical records.

6. The system of claim 1, wherein the web application being executed on an Enterprise Messaging Network device is at least one of an Enterprise Messaging Network portal at the one or more Enterprise Messaging Network services, or an Electronic Medical Records (EMR) system.

7. The system of claim 1, wherein the visitor devices, the Enterprise Messaging Network, and the server are in communication via a communication network.

8. The system of claim 1, wherein Enterprise Messaging Network device is at least one of a tablet computer, personnel computer, personnel digital assistant, smart phone, smart television, palm top, phablet, laptop, or a device with computational capability connected to the internet.

9. The system of claim 1, wherein the visitor devices are at least one of a tablet computer, personnel computer, personnel digital assistant, smart phone, smart television, palm top, phablet, laptop, or a device with computational capability connected to the internet.

10. The system of claim 1, wherein the server further includes a portal software module executed by the processor, wherein the portal software module is configured to provide staff members of a hospital, a clinic, or a business with a staff member of a hospital, a clinic, or a business portal for presenting contents of the staff members of a hospital, a clinic, or a business, and for including at least one of content updating, content modification, messaging service, video conferencing, scheduling, and creation, collection, management and distribution of structured data, for business or clinical need.

11. A computer-implemented method for facilitating secure, real-time communication and data interaction within a browser environment, the method comprising:

executing, by a browser extension or plugin component directly communicating with LiveNetworks server stored in memory and executed by a processor on a device of a staff member of a hospital, a clinic, or a business, a web application;

integrating and displaying user interfaces of one or more Enterprise Messaging Network services over the web application in the browser environment;

enabling, via an instant communication module, real-time communication including video conferencing and messaging between the staff member and one or more visitors through the Enterprise Messaging Network services;

configuring, via a cross-domain configuration framework implemented on a server, secure, permissioned interaction of the browser extension or plugin with external websites, third-party applications, and social media platforms while maintaining compliance with health-care data privacy requirements;

detecting and visually marking content related to Liv-eNetworks services on a web application, including adding image and text links on top of the web appli-cation running in a browser, such that a user can interact with the LiveNetworks services;

capturing user-selected data from the web application, the user-selected data including text, images, electronic medical records (EMRs), and other content displayed by third-party services or applications, and recording and organizing the captured data into a structured format in the form of a report;

transforming the structured data or report into one or more visualizations, the visualizations including at least one of bar charts, pie charts, and tables, where the visual-izations are dynamically created based on user selec-tion of the data or report;

enabling sharing of the visualizations or structured data in the form of the report, in real-time during the commu-nication session, including allowing recipient(s) of the visualizations or structured data to search, filter, and dynamically interact with the shared visualizations or structured data, including creating additional charts;

generating, via a link generation module, a unique uni-form resource locator (URL) that identifies a registered staff member or registered user;

launching, in response to clicking the unique URL, the browser extension or plugin and initiating a live video conferencing and messaging session with the identified staff member within the browser environment;

registering, via a registration module, one or more cre-dentials for staff and user accounts;

storing user preferences, session logs, and access privi-leges on the server; and operating the method within existing electronic medical record (EMR) systems, social media platforms, and browser-based applications to facilitate secure, real-time communication and data transfer among health-care personnel, patients, and external collaborators, while ensuring compliance with relevant healthcare data privacy regulations such as HIPAA.

12. The method of claim 11, wherein the visitors com-municate with the staff members of a hospital, a clinic, or a business s via one or more Enterprise Messaging Network services.

13. The method of claim 12, wherein the one or more Enterprise Messaging Network services include a live video conferencing service, a messaging service, a group messag-ing service and a file sharing service.

14. The method of claim 11, wherein the visitor devices, the staff members of a hospital, a clinic, or a business, and the server are in communication via a communication net-work.

15. The method of claim 11, wherein the staff members of a hospital, a clinic, or a business device is at least one of a tablet computer, personnel computer, personnel digital assis-tant, smart phone, smart television, palm top, phablet, lap-top, or a device with computational capability connected to the internet.

16. The method of claim 11, wherein the visitor devices are at least one of a tablet computer, personnel computer, personnel digital assistant, smart phone, smart television, palm top, phablet, laptop, or a device with computational capability connected to the internet.

* * * * *